United States Patent
Oda et al.

(10) Patent No.: US 7,376,748 B1
(45) Date of Patent: May 20, 2008

(54) DATA DELIVERING SYSTEM

(75) Inventors: Yasutaka Oda, Kobe (JP); Katzumi Hayashi, Kobe (JP); Masaya Kimura, Kobe (JP); Taichi Ujigawa, Kobe (JP)

(73) Assignee: Fujitsu Limited, Kawasaki (JP)

( * ) Notice: Subject to any disclaimer, the term of this patent is extended or adjusted under 35 U.S.C. 154(b) by 1567 days.

(21) Appl. No.: 09/667,225

(22) Filed: Sep. 21, 2000

(30) Foreign Application Priority Data

Dec. 1, 1999 (JP) .................................. 11-341709

(51) Int. Cl.
G06F 15/173 (2006.01)
G06F 15/16 (2006.01)

(52) U.S. Cl. ................. 709/238; 709/245; 709/242

(58) Field of Classification Search ........ 709/200–203, 709/238, 242, 245; 715/513; 707/501
See application file for complete search history.

(56) References Cited

U.S. PATENT DOCUMENTS

| | | | | |
|---|---|---|---|---|
| 5,897,622 | A * | 4/1999 | Blinn et al. ................. | 705/26 |
| 6,105,067 | A * | 8/2000 | Batra ......................... | 709/227 |
| 6,148,296 | A * | 11/2000 | Tabbara ....................... | 707/3 |
| 6,189,019 | B1 * | 2/2001 | Blumer et al. ............... | 715/513 |
| 6,304,914 | B1 * | 10/2001 | Deo et al. ................... | 709/247 |
| 6,456,308 | B1 * | 9/2002 | Agranat et al. ............. | 345/854 |
| 6,539,359 | B1 * | 3/2003 | Ladd et al. ................. | 704/275 |
| 6,585,778 | B1 * | 7/2003 | Hind et al. ................. | 715/513 |
| 6,633,887 | B2 * | 10/2003 | Suzuki et al. ............... | 707/102 |
| 6,662,217 | B1 * | 12/2003 | Godfrey et al. ............. | 709/219 |
| 6,675,353 | B1 * | 1/2004 | Friedman .................... | 715/513 |
| 6,741,555 | B1 * | 5/2004 | Li et al. ..................... | 370/229 |
| 2002/0038357 | A1 * | 3/2002 | Haverstock et al. ........ | 709/218 |
| 2003/0149733 | A1 * | 8/2003 | Capiel ........................ | 709/206 |

FOREIGN PATENT DOCUMENTS

| | | |
|---|---|---|
| JP | 63-16749 | 1/1988 |
| JP | 2-43843 | 2/1990 |
| JP | 2-137537 | 5/1990 |
| JP | 4-7935 | 1/1992 |
| JP | 6-152917 | 5/1994 |
| JP | 9-311831 | 12/1997 |
| JP | 11-184769 | 7/1999 |
| JP | 11-272597 | 10/1999 |

OTHER PUBLICATIONS

Japanese Office Action mailed Sep. 21, 2004 in corresponding Japanese Patent Application No. 11-341709.

* cited by examiner

Primary Examiner—Kenny Lin
(74) Attorney, Agent, or Firm—Staas & Halsey LLP

(57) ABSTRACT

A headquarters system generates structure information, and obtains nationwide news from a resource system according to the structure information. The headquarters system delivers the structure information and the nationwide news to a branch system. The branch system obtains local news from a resource system according to the structure information received from the headquarters system, and delivers the nationwide news and the local news to a plurality of destinations according to the structure information.

5 Claims, 42 Drawing Sheets

| ELEMENT DATA-1 | DESTINATION INFORMATION-1 |
|---|---|
| ELEMENT DATA-2 | DESTINATION INFORMATION-2 |
| ELEMENT DATA-3 | DESTINATION INFORMATION-3 |
| ... | ... |
| ELEMENT DATA-n | DESTINATION INFORMATION-n |

| RELAY SYSTEM INFORMATION | ASSEMBLY INFORMATION | ELEMENT DATA INFORMATION 1 | ... | ELEMENT DATA INFORMATION n | DELIVERY DESTINATION INFORMATION |
|---|---|---|---|---|---|
F I G. 1 0 A
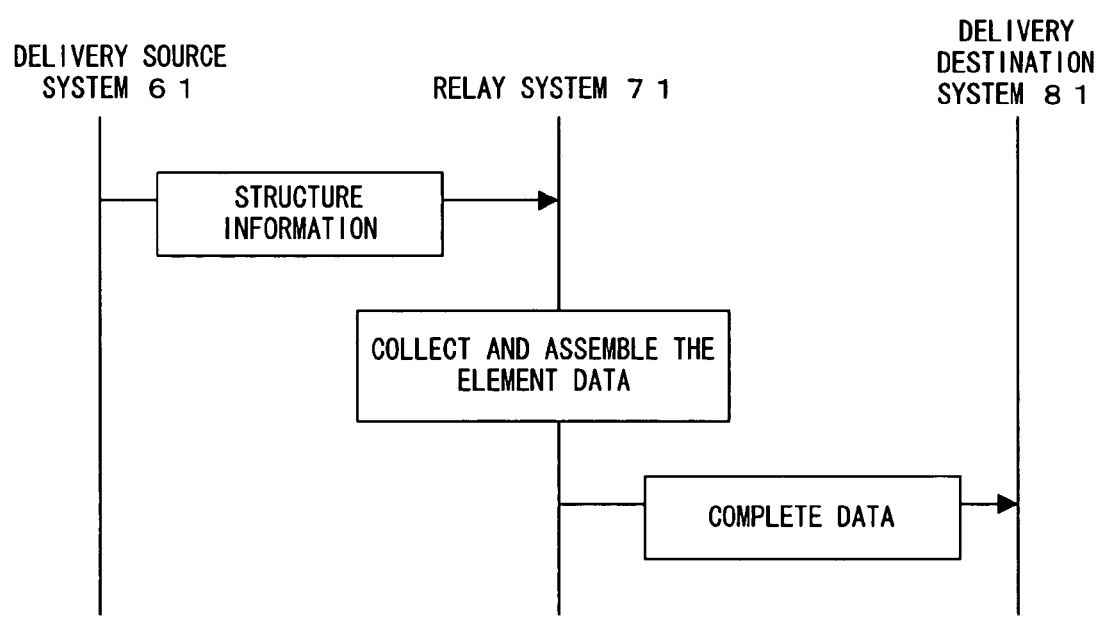
F I G. 1 0 B

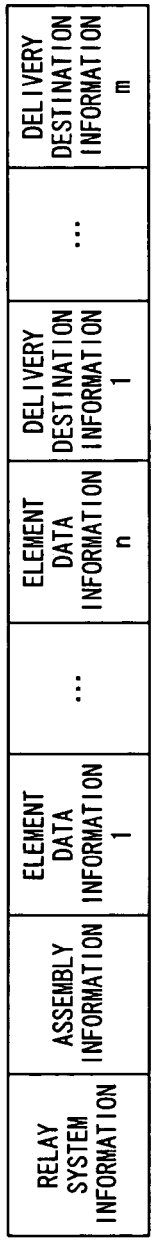

| RELAY SYSTEM INFORMATION 2 | ASSEMBLY INFORMATION | ELEMENT DATA INFORMATION 1 | ... | ELEMENT DATA INFORMATION n | DELIVERY DESTINATION INFORMATION |
|---|---|---|---|---|---|

RELAY SYSTEM INFORMATION INDICATES DELIVERY DESTINATION SYSTEM

F I G. 1 6 A

F I G. 1 6 B

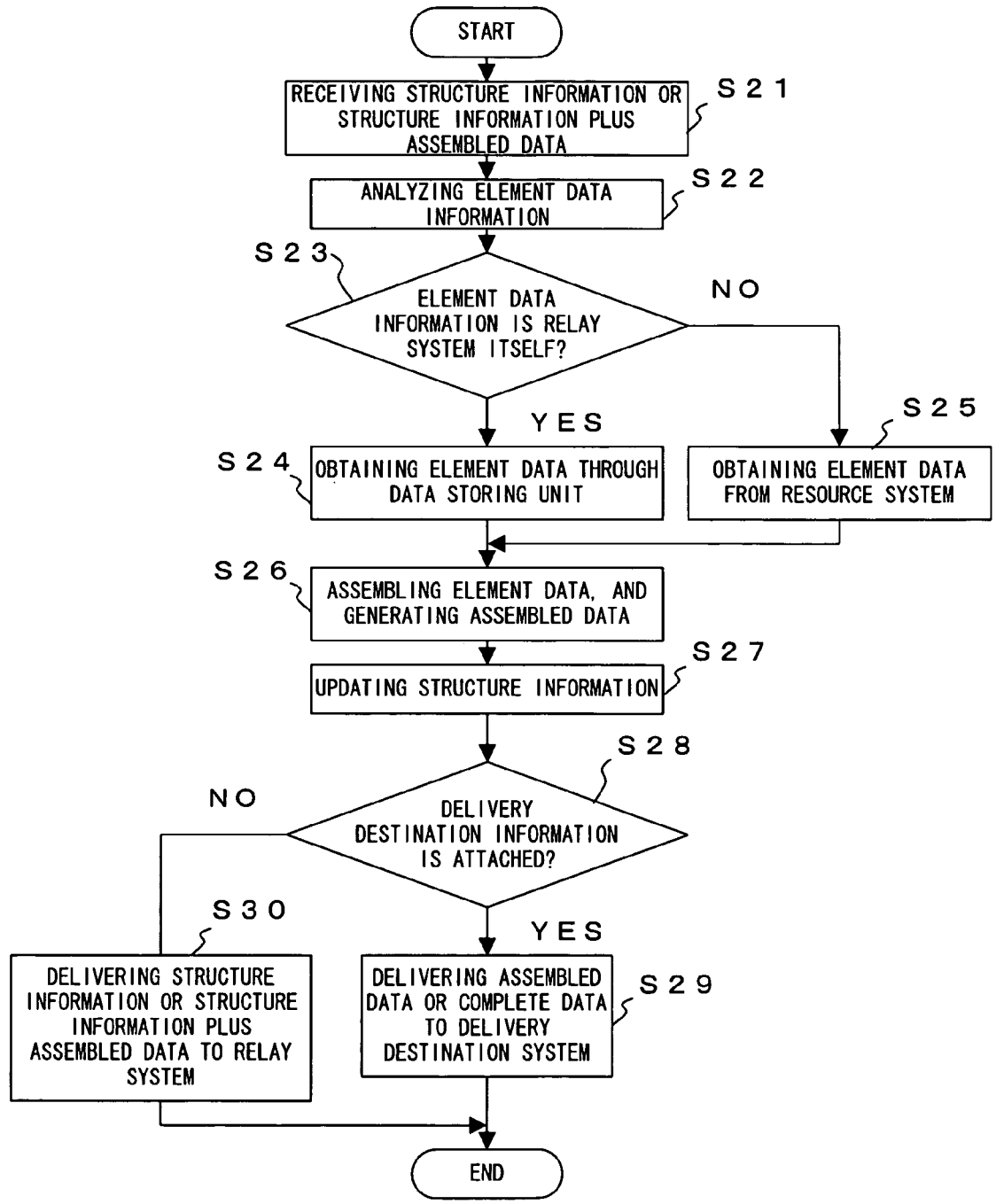
F I G. 1 8

| HEADQUARTERS SYSTEM | ATTACH | NATIONWIDE NEWS | | | |
|---|---|---|---|---|---|
| BRANCH A SYSTEM | ASSEMBLED DATA + LOCAL NEWS | LOCAL NEWS | DELIVERY DESTINATION A-1 | ... | DELIVERY DESTINATION A-n |
| BRANCH B SYSTEM | ASSEMBLED DATA + LOCAL NEWS | LOCAL NEWS | DELIVERY DESTINATION B-1 | ... | DELIVERY DESTINATION B-n |
| BRANCH C SYSTEM | ASSEMBLED DATA + LOCAL NEWS | LOCAL NEWS | DELIVERY DESTINATION C-1 | ... | DELIVERY DESTINATION C-n |

FIG. 22

| HEADQUARTERS SYSTEM | ATTACH | NATIONWIDE NEWS | |
|---|---|---|---|
| BRANCH A SYSTEM | ASSEMBLED DATA+LOCAL NEWS | LOCAL NEWS | SUBSCRIBER |
| BRANCH B SYSTEM | ASSEMBLED DATA+LOCAL NEWS | LOCAL NEWS | SUBSCRIBER |
| BRANCH C SYSTEM | ASSEMBLED DATA+LOCAL NEWS | LOCAL NEWS | SUBSCRIBER |

FIG. 23

| GROUP NAME | DELIVERY DESTINATION |
|---|---|
| SUBSCRIBERS | A−1<br>A−2<br>⋮<br>A−n |
| BUSINESS PARTNERS | X−1<br>X−2<br>⋮<br>X−m |
| ⁅ | ⁅ |

FIG. 24

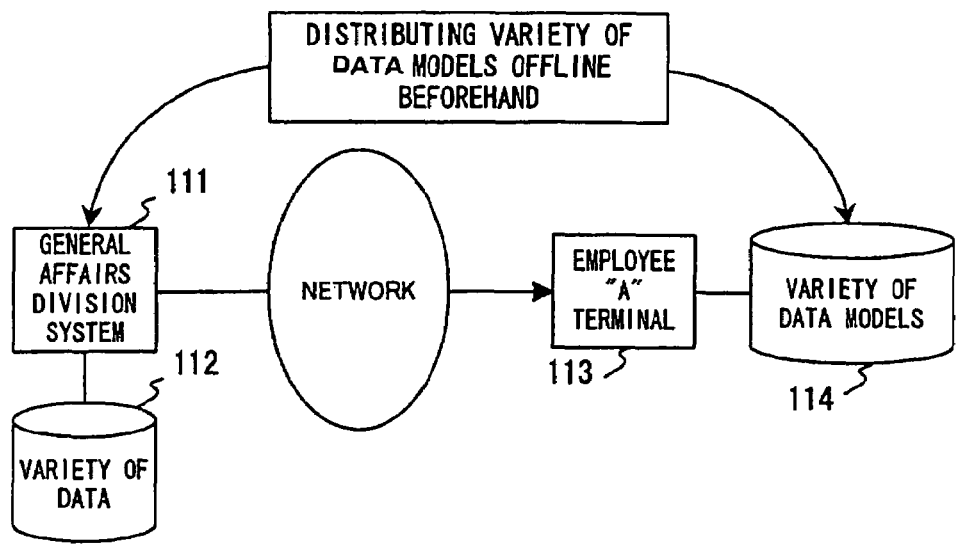
F I G. 26A
| GENERAL AFFAIRS DIVISION SYSTEM | ATTACH | BUSINESS PERFORMANCE DATA | INTEROFFICE MEMO | BUSINESS TRIP EXPENSE ADJUSTMENT STATEMENT |
|---|---|---|---|---|
| EMPLOYEE "A" TERMINAL | ASSEMBLY INFORMATION | BUSINESS PERFORMANCE REPORT MODEL | INTEROFFICE MEMO MODEL | BUSINESS TRIP EXPENSE ADJUSTMENT STATEMENT MODEL | EMPLOYEE "A" TERMINAL |
|---|---|---|---|---|---|
F I G. 26B

```
<?xml version="1.0"?>
<delivery_definition>
  <!--NewYork-->
  <delivery_info>
    <gateway>newyork@delivery.com</gateway>
    <structure>http://www.delivery.com/structure/news.xml</structure>
    <data_list>
       <news>http.//www.delivery.com/world_news.xml</news>
    </data_list>
    <receptionist_list>
       <receptionist>U-1@foo.com</receptionist>
       ...
       <receptionist>U-n@foo.com</receptionist>
    </receptionist_list>
    <!--Yugoslavian-->
    <delivery_info>
      <gateway>yugo@delivery.com</gateway>
      <data_list>
        <news>news.xml</news>
      </data_list>
      <receptionist_list>
        <receptionist>Y-1@foo.com</receptionist>
        ...
        <receptionist>Y-n@foo.com</receptionist>
      </receptionist_list>
  </delivery_info>
  <!--Asia-->
  <delivery_info>
    <getaway>asia@delivery.com</getaway>
    <structure>http.//asia.delivery.com/structure/news.xml</structure>
    <data_list>
      <news>news.xml</news>
      <news>http://asia.delivery.com/asian_news.xml</news>
    </data_list>
    <receptionist_list>
      <category>asia</category>
    </receptionist_list>
    <!--Japan-->
    <delivery_info>
      <gateway>japan@delivery.co.jp</gateway>
      <structure>http://www.delivery.co.jp/structure/japan.xml</structure>
      <data_list>
        <news>news.xml</news>
        <news>http://www.delivery.co.jp/japan_news.xml</news>
      </data_list>
      <receptionist_list>
        <category>japan</category>
      </receptionist_list>
    </delivery_info>
  </delivery_info>
</delivery_info>
</delivery_definition>
```

FIG. 28

```
<!--NewYork-->
<delivery_info>
   <gateway>newyork@delivery.com</gateway>
   <structure>http://www.delivery.com/structure/news.xml</structure>
   <data_list>
      <news>http://www.delivery.com/world_news.xml</news>
   </data_list>
   <receptionist_list>
      <receptionist>U-1@foo.com</receptionist>
        ...
      <receptionist>U-n@foo.com</receptionist>
   </receptionist_list>
```

FIG. 29

```
<!--Yugoslavian-->
<delivery_info>
    <gateway>yugo@delivery.com</gateway>
    <data_list>
      <news>news.xml</news>
    </data_list>
    <receptionist_list>
      <receptionist>Y-1@foo.com</receptionist>
       ...
      <receptionist>Y-n@foo.com</receptionist>
    </receptionist_list>
```

FIG. 30

```
<!--Asia-->
<delivery_info>
    <gateway>asia@delivery.com</gateway>
    <structure>http://asia.delivery.com/structure/news.xml</structure>
    <data_list>
      <news>news.xml</news>
      <news>http://asia.delivery.com/asian_news.xml</news>
    </data_list>
    <receptionist_list>
      <category>asia</category>
    </receptionist_list>
```

FIG. 31

```
<!--Japan-->
<delivery_info>
    <gateway>japan@delivery.co.jp</gateway>
    <structure>http://www.delivery.co.jp/structure/japan.xml</structure>
    <data_list>
        <news>news.xml</news>
        <news>http://www.delivery.co.jp/japan_news.xml</news>
    </data_list>
    <receptionist_list>
        <category>japan</category>
    </receptionist_list>
```

FIG. 32

```
<?xml version="1.0"?>

<!DOCTYPE daily_news [
<!ENTITY world_news SYSTEM "world_news.xml">
]>

<daily_news>
<date>2xxx-xx-xx</date>
<edition>xx</edition>
&world_news;
</daily_news>
```

F I G.  3 3 A

```
<?xml version="1.0"?>

<!DOCTYPE daily_news [
<!ENTITY world_news SYSTEM "http://www.delivery.com/world_news.xml">
]>

<daily_news>
<date>2xxx-xx-xx</date>
<edition>xx</edition>
&world_news;
</daily_news>
```

F I G.  3 3 B

```
<?xml version="1.0"?>

<daily_news>
<date>2xxx-xx-xx<date>
<edition>xx</edition>
<world_news>
. . . . . . . . . . . . . . . . . . . . . . . . . . .
. . . . . . . . . . . .
</world_news>
</daily_news>
```

FIG. 34

```
<?xml version="1.0"?>

<!DOCTYPE daily_news> [
<!ENTITY  news        SYSTEM "news.xml">
<!ENTITY  asian_news  SYSTEM "asian_news.xml">
]>
 <daily_news>
<date>2yyy-yy-yy</date>
<edition>yy</edition>
&asian_news;
&news;
</daily_news>
```

FIG. 35

```
<?xml version="1.0"?>

<daily_news>
<date>2yyy-yy-yy</date>
<edition>yy</edition>
<asian_news>
. . . . . . . . . . . . . . . . . . . . . . . . . . .
. . . . . . . . . . . .
</asian_news>
<daily_news>
<date>2xxx-xx-xx</date>
<edition>xx</edition>
<world_news>
. . . . . . . . . . . . . . . . . . . . . . . . . . .
. . . . . . . . . . . .
</world_news>
</daily_news>
</daily_news>
```

FIG. 36

```
<?xml version="1.0"?>

<!DOCTYPE daily_news> [
<!ENTITY  news        SYSTEM "news.xml">
<!ENTITY  japan_news  SYSTEM "japan_news.xml">
]>
 <daily_news>
<date>2zzz-zz-zz</date>
<edition>zz</edition>
&japan_news;
&news;
</daily_news>
```

F I G.  3 7

```
<?xml version="1.0"?>

<daily_news>
<date>2zzz-zz-zz</date>
<edition>zz</edition>
<japan_news>
. . . . . . . . . . . . . . . . . . . . . . . . . . . . . . . .
. . . . . . . . . . . . .
</japan_news>
<daily_news>
<date>2yyy-yy-yy</date>
<edition>yy</edition>
<asian_news>
. . . . . . . . . . . . . . . . . . . . . . . . . . . . . . . .
. . . . . . . . . . . . .
</asian_news>
</daily_news>
<date>2xxx-xx-xx</date>
<edition>xx</edition>
<world_news>
. . . . . . . . . . . . . . . . . . . . . . . . . . . . . . . .
. . . . . . . . . . . . .
</world_news>
</daily_news>
</daily_news>
</daily_news>
```

F I G. 3 8

```
<?xml version="1.0"?>

<!DOCTYPE daily_news> [
<!ENTITY  news          SYSTEM "news.xml">
<!ENTITY  japan_news    SYSTEM "japan_news.xml">
<!ENTITY  personal_news SYSTEM "personal_news.xml">
]>
 <daily_news>
<date>2zzz-zz-zz</date>
<edition>zz</edition>
&personal_news;
&japan_news;
&news;
</daily_news>
```

FIG. 39

| DELIVERY ADDRESS | GENRE 1 | GENRE 2 | · · · | GENRE n |
|---|---|---|---|---|
| J-1@foo.ne.jp | on | off | | on |
| ⋮ | | | | |
| J-n@foo.ne.jp | off | on | | off |

DATA DELIVERING SYSTEM

BACKGROUND OF THE INVENTION

1. Field of the Invention

The present invention relates to a method for delivering data to devices connected via a communications network.

2. Description of the Related Art

Generally, when data is delivered, a device at a delivery source must prepare the information identifying a delivery destination (hereinafter referred to as "destination information" or "delivery destination information"), and data to be delivered for each delivery destination.

FIG. 1 explains an existing general data delivering system. This figure depicts the device at a data delivery source and an external storage medium accessed by this device. Note that this system is assumed to deliver data based on a user instruction (delivery request).

A data managing unit 501 makes a data storing unit 502 collect the data corresponding to a user instruction. The data storing unit 502 obtains the data to be delivered to a user from an external storage medium 511 according to an instruction from the data managing unit 501. Then, the data managing unit 501 provides a data transferring unit 503 with the data collected by the data storing unit 502 and the destination information of that data. The data transferring unit 503 issues a data transfer instruction to a communication controlling unit 504. The communication controlling unit 504 then delivers the requested data to the user according to the data transfer instruction.

When data is delivered to a plurality of destinations with the above described system, the above stated process is repeatedly executed or a multi-cast transmission is performed if it is possible. The method repeating the above described process, however, imposes a heavy load on a device at a delivery source. On the other hand, the multi-cast transmission can only transmit the same data to all of destinations.

As a known method delivering data that differs depending on each destination, for example, Japanese Laid-open Patent Publication No. 6-152917 is known. This publication recites the technique with an improved merging capability. Hereinafter, the technique relating to Japanese Laid-open Patent Publication No. 6-152917 is explained by referring to FIGS. 2, 3A, and 3B.

FIG. 2 explains an existing data delivering system with a merging capability. This figure depicts a device at a data delivery source and an external storage media accessed by that device. Here, it is assumed that data in a common format (hereinafter referred to as "combined data") shown in FIG. 3A is generated and delivered to each destination. The combined data is composed of a variable portion which differs depending on each destination, and a common portion which is common to all of destinations.

A data managing unit 521 makes a common data storing unit 522 collect common data which is common element data to be delivered to a destination, for example, according to a user instruction. The common data storing unit 522 then collects the common data from an external storage medium 531, and passes the collected data to the data managing unit 521. This collected data is stored in the common portion of the combined data, but its variable portion is empty at this stage.

Next, the data managing unit 521 makes a variable data storing unit 523 collect variable data. The variable data storing unit 523 therefore collects variable data from an external storage medium 532, and passes the collected data to the data managing unit 521. It should be noted that variable data includes destination information for identifying corresponding destination, and element data to be delivered to corresponding destination, for example, as shown in FIG. 3B.

The data managing unit 521 separates the variable data into the destination information and the element data. Then, the data managing unit 521 inserts (merges) element data-1 into the variable portion of the combined data, attaches destination information-1 to the combined data, and passes the combined data to a data transferring unit 524. The data transferring unit 524 issues a data transfer instruction to a communication controlling unit 525. The communication controlling unit 525 delivers the common data into which the element data-1 is inserted to the user identified by the destination information-1 according to the data transfer instruction. Thereafter, combined data into which element data-2 through element data-n are respectively inserted are delivered to respective users identified by destination information-2 through destination information-n.

In addition to the above described method, methods for delivering data that differs depending on each destination have been proposed. For example, the technique recited in Japanese Laid-open Patent Publication No. 63-16749, the technique recited in Japanese Laid-open Patent Publication No. 9-311831, etc. are proposed. With the former method, all candidate data to be inserted into a variable portion are delivered from a delivery source to destinations along with common data, and the users at the destinations respectively select necessary information. With the latter method, data is delivered in a form (image, audio, text, etc.) requested by each destination.

However, conventional data delivering methods have the following problems.

(1) A delivery source system must store all data to be delivered to corresponding destinations, or at least prepare all data to be delivered to corresponding destinations. Accordingly, the load on the delivery source system becomes heavy. Additionally, most of the known methods cannot start a data delivery until all data (to be delivered to all of destinations) are collected, when data that differs depending on each destination is delivered. Therefore a data delivery delay becomes problematic in this case.

(2) A delivery source system must store the information about all of destinations (such as IP or mail addresses, system names, or the like). Therefore, the operations for managing destinations become complicated in the delivery source system.

(3) A delivery source system must generate (or assemble) all of delivery data, when data that differs depending on each destination is delivered. Therefore, the load on the delivery source system becomes heavy.

(4) All of delivery data are output from a delivery source system, when data that differs depending on each destination is delivered. Therefore, lines or paths adjacent to the delivery source system are occupied by that data delivery.

SUMMARY OF THE INVENTION

An object of the present invention is to reduce a load on a delivery source in a data delivering system. Another object of the present invention is to improve data delivery efficiency.

A data delivering method according to the present invention assumes a data delivery to a device connected via a network. With this method, structure information including the information for collecting element data is transmitted from a first to a second device, and the second device collects the element data according to the structure information and delivers the collected data to a third device.

With this method, the element data to be delivered to the third device is collected by the second device. That is, the first device does not need to collect the element data to be delivered to the third device. As a result, the load on the first device as a deliver source device is reduced.

With a data delivering method in another aspect of the present invention, structure information including first information for identifying the element data to be delivered to a destination device, second information for identifying a device that collects element data, and third information for identifying the destination device is generated, and the device identified by the second information collects the element data according to the first information, and delivers the collected element data to the destination device identified by the third information.

With this method, a data delivery can easily be implemented in a wide variety of forms by the descriptions of the first to the third information. For example, if a plurality of devices are specified in the second information, the plurality of specified devices can share a burden to collect the element data identified by the first information. As a result, a system with a high data delivery efficiency can be realized with ease.

In this method, a delivery destination group including a plurality of destination devices may be specified as the third information, and the device identified by the second information may deliver the element data to the plurality of destination devices belonging to the delivery destination group specified by the third information. In this method, a delivery source device does not need to recognize the addresses of final delivery destinations.

A data delivering method in a further aspect of the present invention assumes a data delivery from a delivery source device to a delivery destination device in a system including the delivery source device, a first relay device, and second and third relay devices arranged in parallel. With this method, structure information is generated by the delivery source device, and first element data is collected by the first relay device according to the structure information. Furthermore, second element data is collected by the second relay device according to the structure information, and the first and the second element data are delivered from the second relay device to the delivery destination device that is connected to the second relay device. In the meantime, third element data is collected by the third relay device according to the structure information, and the first and the third element data are delivered from the third relay device to the delivery destination device that is connected to the third relay device.

With this method, when data that is partially common is delivered to a plurality of delivery destinations, the common data is collected by one device (a first relay device), and variable data that differs depending on each delivery destination is collected by a different device (the second and the third relay device). Accordingly, the common data is never be collected repeatedly, leading to a high data delivery efficiency.

BRIEF DESCRIPTION OF THE DRAWINGS

FIG. 10A exemplifies the structure information (No. 1);

FIG. 10B exemplifies a data delivery sequence (No. 1);

FIG. 11A exemplifies the structure information (No. 2);

FIG. 11B exemplifies the data delivery sequence (No. 2);

FIG. 18 is a flowchart showing the operations of the relay system;

FIG. 22 exemplifies the structure information used in the first embodiment;

FIG. 23 exemplifies another form of the structure information used in the first embodiment;

FIG. 24 exemplifies a delivery destination list;

FIG. 26A shows the configuration of a system according to a second embodiment;

FIG. 26B exemplifies the structure information used in the second embodiment;

FIG. 28 exemplifies the structure information used in the third embodiment;

FIG. 29 exemplifies part of the structure information for a headquarters system;

FIG. 30 exemplifies part of the structure information for each branch system (No. 1);

FIG. 31 exemplifies part of the structure information for each branch system (No. 2);

FIG. 32 exemplifies part of the structure information for each branch system (No. 3);

FIGS. 33A and 33B exemplify assembly information;

FIG. 34 exemplifies assembled data generated by the headquarters system;

FIG. 35 exemplifies assembly information;

FIG. 36 exemplifies assembled data generated by an Asian branch system;

FIG. 37 exemplifies assembly information;

FIG. 38 exemplifies delivery data generated by a Japanese branch system;

FIG. 39 exemplifies assembly information used when data that differs depending on each subscriber is delivered;

DESCRIPTION OF THE PREFERRED EMBODIMENTS

Figure 1:
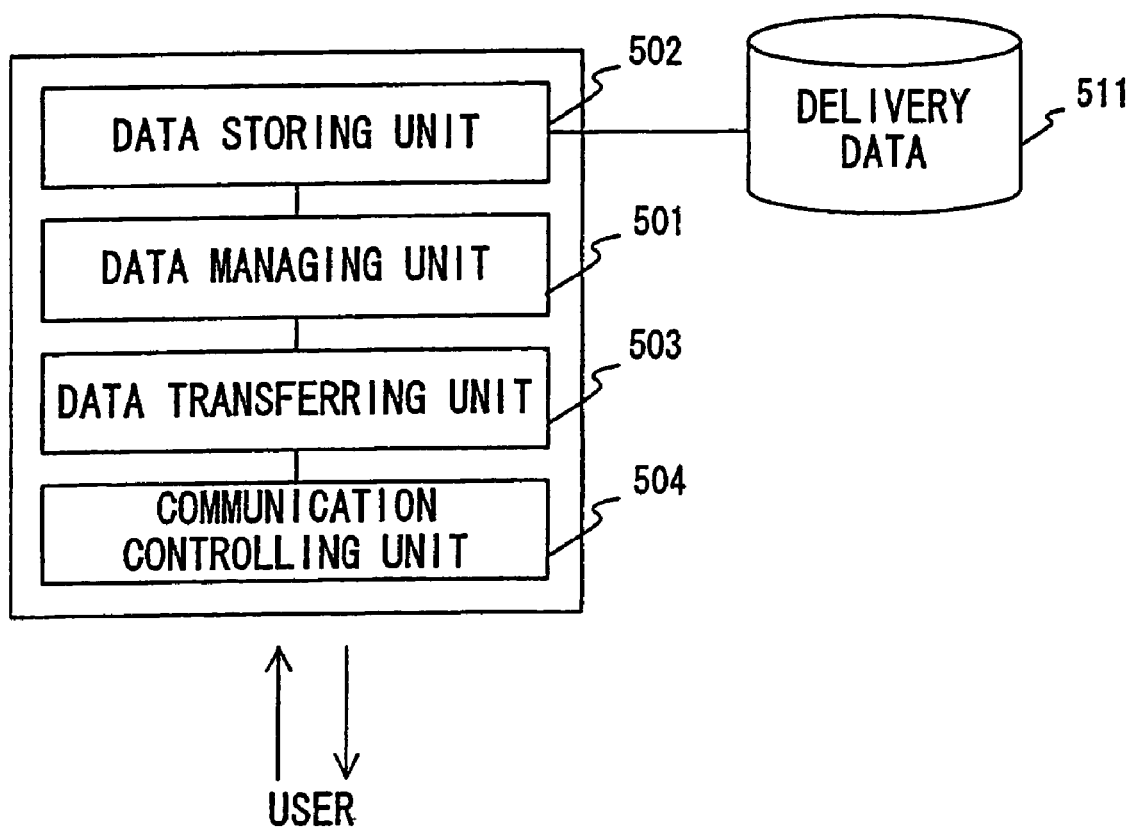
FIG. 1 explains an existing general data delivering system.

Hereinafter, preferred embodiments according to the present invention will be explained by referring to the drawings.

Figure 4:
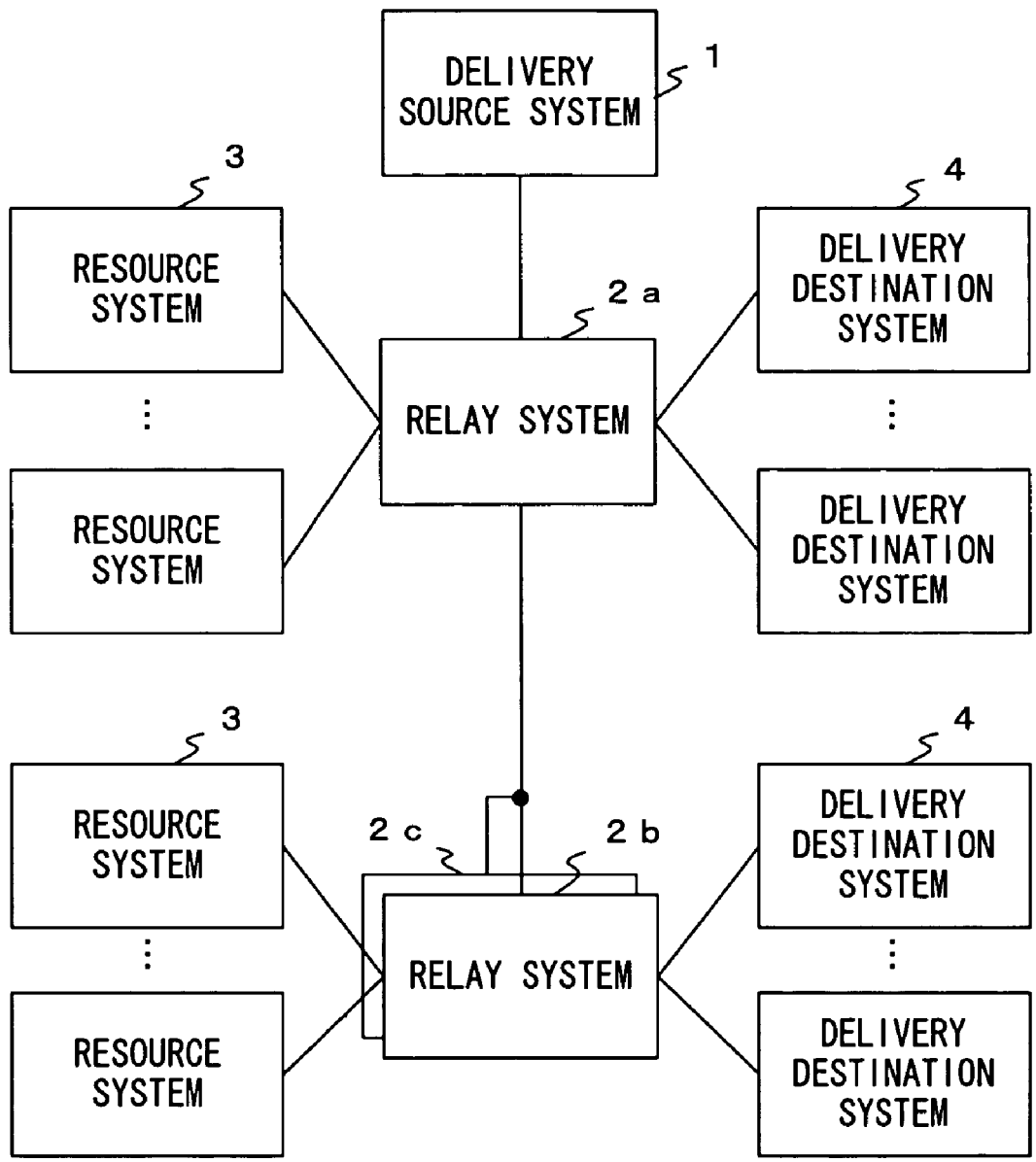
FIG. 4 shows a data delivering system according to one embodiment of the present invention.

FIG. 4 shows the configuration of a data delivering system according to one preferred embodiment of the present invention. With this system, data is delivered from a delivery source system 1 to one or a plurality of delivery destination systems 4. A method of the data delivery may be a push type (a method in which the delivery source system 1 spontaneously transmits data), or an on-demand type (a method in which the delivery source system 1 transmits data according to a request from the delivery destination system 4).

The delivery source system 1 is connected to the delivery destination systems 4 via relay systems 2a through 2c in this embodiment. That is, the relay systems 2a through 2c are connected subordinately to (or downstream from) the delivery source system 1, and the delivery destination systems 4 are connected subordinately to (or downstream from) the relay systems 2a through 2c. The relay systems 2a through 2c are connected in series and/or in parallel. In the example shown in FIG. 4, the relay systems 2a and 2b are connected in series, and the relay systems 2a and 2c are connected in series. On the other hand, the relay systems 2b and 2c are connected in parallel. In other words, the relay systems 2b and 2c are connected on the same level of the subordinates (or the downstream) of the relay system 2a.

The present invention is not limited to this configuration. The number of connection stages of relay systems is not limited particularly. Additionally, the delivery source system 1 and the delivery destination systems 4 may directly be connected not via relay systems.

The relay systems 2a through 2c are connected to resource systems 3. The resource systems are positioned on the same levels as those of the corresponding relay systems 2a through 2c in this case. Furthermore, the resource systems 3 store the resources (data) to be delivered to the delivery destination systems 4. It should be remembered that the present invention is not limited to this configuration. For example, the delivery source system 1 or the delivery destination systems 4 may directly access the resource systems 3.

The delivery source system 1, the relay systems 2a through 2c, the resource systems 3, and the delivery destination systems 4 are connected-via a network. The configuration of the network is not particularly limited. The network may be a wireless network, a network using optical fibers or metal cables, or a public or a private network. Also, communications protocols are not limited particularly.

The delivery source system 1 delivers data to the delivery destination systems 4 according to a request issued from the delivery destination systems 4 or spontaneously. If the delivery source system 1 itself holds or collects the data to be delivered to the delivery destination systems 4, it delivers the data to the delivery destination systems 4. Or, if the delivery source system 1 itself does not hold or collect the data to be delivered to the delivery destination systems 4, it generates a information set instructing to collect and to assemble data to be delivered to the delivery destination systems 4 (this information is hereinafter referred to as "structure information"), and transmits the generated information to the relay systems 2a through 2c. Then, the relay systems 2a through 2c collect the data to be delivered to the delivery destination systems 4 from the resource systems 3 according to the structure information, and deliver the collected data to the delivery destination systems 4. If the delivery source system 1 itself holds or collects part of the data to be delivered to the delivery destination systems 4, it delivers the data to the delivery destination systems 4, and also transmits the structure information for data that cannot be prepared to the relay systems 2a through 2c. Then, the relay systems 2a through 2c transfer the data transmitted from the delivery source system 1 to the delivery destination systems 4, and deliver the data that is collected from the resource systems 3 according to the received structure information to the delivery destination systems 4.

Data delivered to the delivery destination systems 4 is composed of one or more pieces of element data. Accordingly, each element in the data to be delivered to the delivery destination systems 4 is hereinafter referred to as "element data" in some cases.

As described above, the delivery source system 1 can make other devices (the relay systems 2a through 2c in this case) collect part or the whole of the data to be delivered to the delivery destination systems 4. Accordingly, the storage device for storing the data to be delivered to the delivery destination systems 4 can be reduced in size in the delivery source system 1. Additionally, the load on the delivery source system 1 is reduced. Furthermore, since the element data (actual data) and the structure information (control information) are separated in this data delivering system, an efficient data delivery can be implemented.

Figure 5:
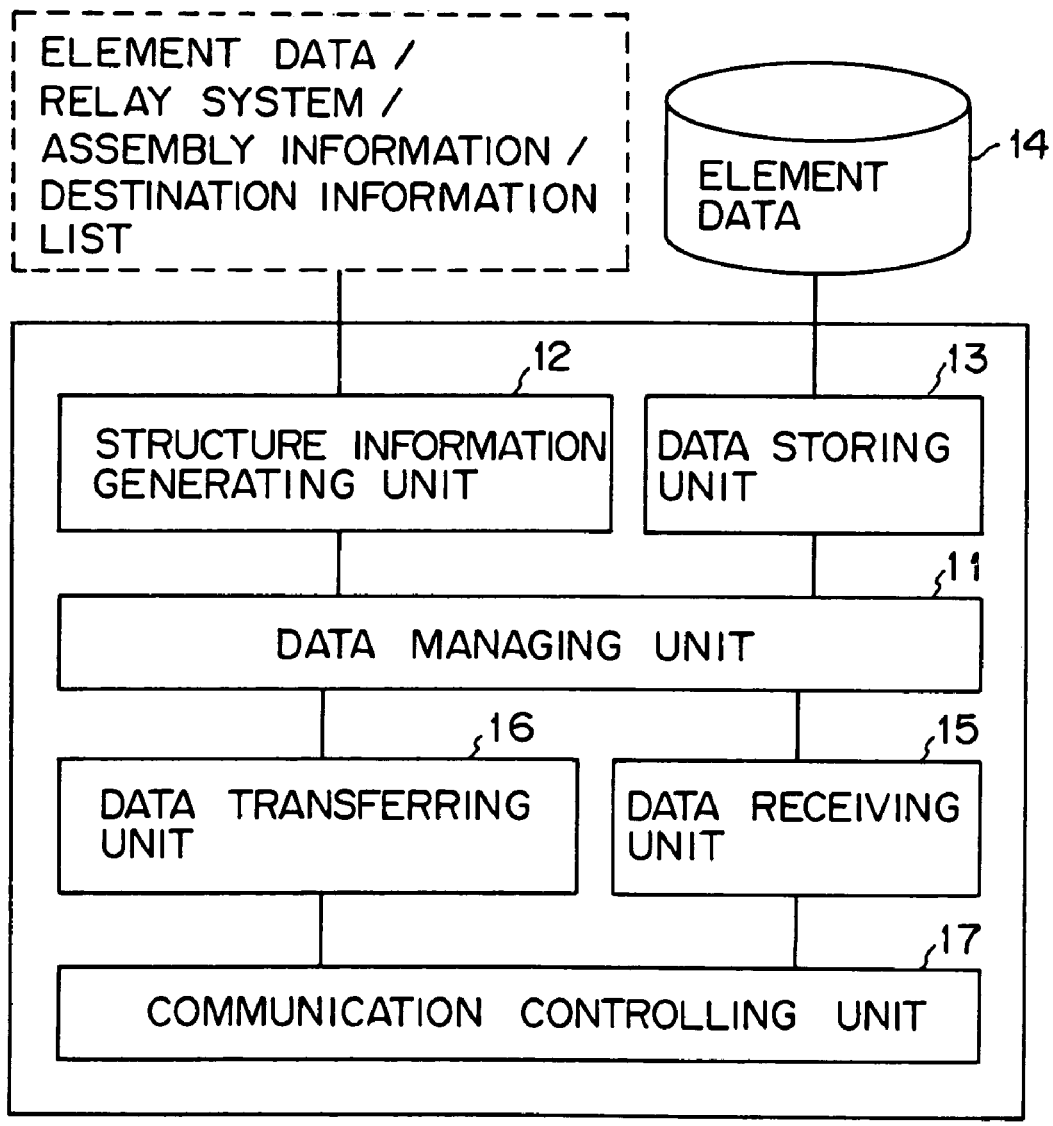
FIG. 5 shows the configuration of a delivery source system.

FIG. 5 shows the configuration of a delivery source system. This delivery source system corresponds to the delivery source system 1 shown in FIG. 4.

A data managing unit 11 gives an instruction to generate structure information to a structure information generating unit 12 according to a user request or spontaneously, and manages generated structure information. The structure information, which will be described in detail later, includes relay system information, assembly information, element data information, and destination information. The managing unit 11 gives an instruction to collect element data from a storage medium 14 according to the structure information to a data storing unit 13. Additionally, the data managing unit 11 gives an instruction to collect element data from a resource system (the resource systems 3 shown in FIG. 4) according to the structure information to a data transferring unit 16. The element data that is transferred from the resource system according to this instruction is received by a data receiving unit 15. The data managing unit 11 then manages the element data collected by the data storing unit 13 and the element data received by the data receiving unit 15. Furthermore, the data managing unit 11 gives to the data transferring unit 16 an instruction to transmit the structure information and the element data to a network.

The structure information generating unit 12 generates structure information according to the instruction from the data managing unit 11. The data storing unit 13 accesses the storage medium 14, and collects element data according to the instruction from the data managing unit 11. The storage medium 14 is a storage device that is arranged in this delivery source system, and stores element data.

The data receiving unit 15 receives element data from a resource system. The data receiving unit 15 is a device super ordinate to a communication controlling unit 17. The data transferring unit 16 issues an instruction to transfer element data to the resource system according to the instruction from the data managing unit 11. Furthermore, the data transferring unit 16 gives to the communication controlling unit 17 an instruction to transmit the structure information generated by the structure information generating unit 12, the element data collected by the data storing unit 13, and the element data received by the data receiving unit 15 to a network. The data transferring unit 16 is also a device super ordinate to the communication controlling unit 17. The communication controlling unit 17 passes the data received from the network to the data receiving unit 15, and transmits the structure information and the element data to the network according to the instruction from the data transferring unit 16.

If the delivery source system does not or cannot collect the element data, it transmits only the structure information. Or, if the delivery source system has collected all of the element data defined by the structure information, it transmits the collected data to the network. The delivery source system may not deliver the structure information to the relay system or the delivery destination system in this case. If the delivery source system has collected only part of the element data defined by the structure information, it transmits the collected element data to the network, and also transmits the structure information corresponding to the element data that cannot be collected to the network.

Figure 6:
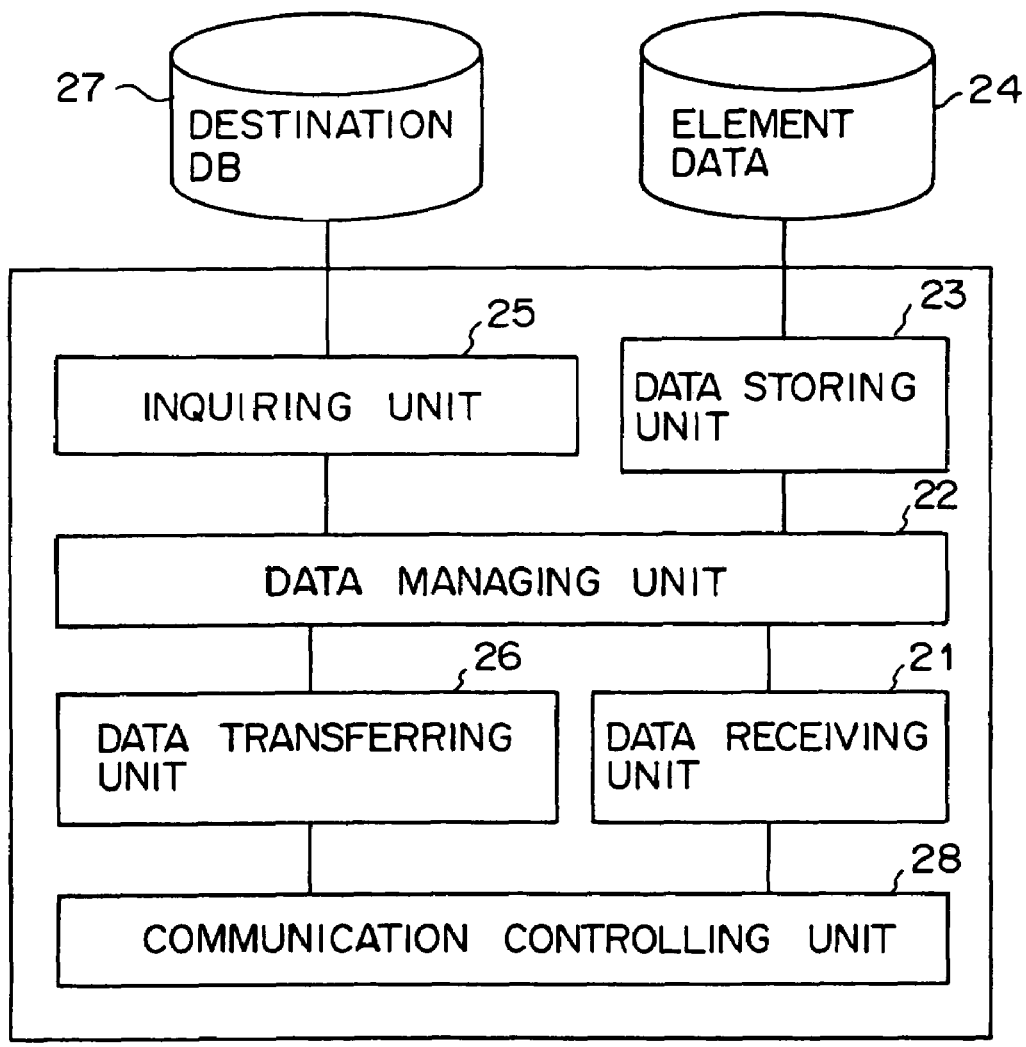
FIG. 6 shows the configuration of are lay system

FIG. 6 shows the configuration of a relay system. This relay system corresponds to an arbitrary one of the relay systems 2a through 2c shown in FIG. 4. Note that the fundamental configuration and operations of the relay system are the same as those of a delivery source system.

A data receiving unit 21 receives structure information and/or element data, which are transmitted from a delivery source system (or another relay system). The data receiving unit 21 also receives element data from a resource system.

A data managing unit 22 gives to a data storing unit 23 an instruction to collect element data from a storage medium 24 according to the structure information received by the data receiving unit 21. If a destination group is set as delivery destination information in the structure information, the data managing unit 22 gives to an inquiring unit 25 an instruction to inquire about a plurality of destinations corresponding to the destination group. The destination group represents, for example, a set of delivery destination systems or a set of relay systems. Furthermore, the data managing unit 22 gives to a data transferring unit 26 an instruction to collect element data from a resource system according to the structure information. The element data that is transferred from the resource system according to this instruction is received by the data receiving unit 21. The data managing unit 22 then manages the element data collected by the data storing unit 23 and the element data received by the data receiving unit 21. Furthermore, the data managing unit 22 gives to the data transferring unit 26 an instruction to transmit the structure information and the element data to the network.

The inquiring unit 25 accesses a destination database 27 according to the instruction from the data managing unit 22, and detects the plurality of destinations corresponding to the destination group set as the delivery destination information in the structure information. The correspondence between a destination group and the destinations included in the destination group is registered to the destination database 27. This correspondence is assumed to be predetermined. The operations of the data storing unit 23, the storage medium 24, the data transferring unit 26, and the communication controlling unit 28 are fundamentally the same as those of the data storing unit 13, the storage medium 14, the data transferring unit 16, and the communication controlling unit 17 of the delivery source system shown in FIG. 5. Therefore, their explanations are omitted here.

As described above, the relay system collects element data according to the structure information transmitted from the delivery source system (or another relay system), and transmits the collected data to the delivery destination system (or the another relay system). If the relay system cannot collect all of the element data defined by the received structure information at this time, it transmits the structure information corresponding to the element data that cannot be collected to a network in addition to the element data.

Figure 7:
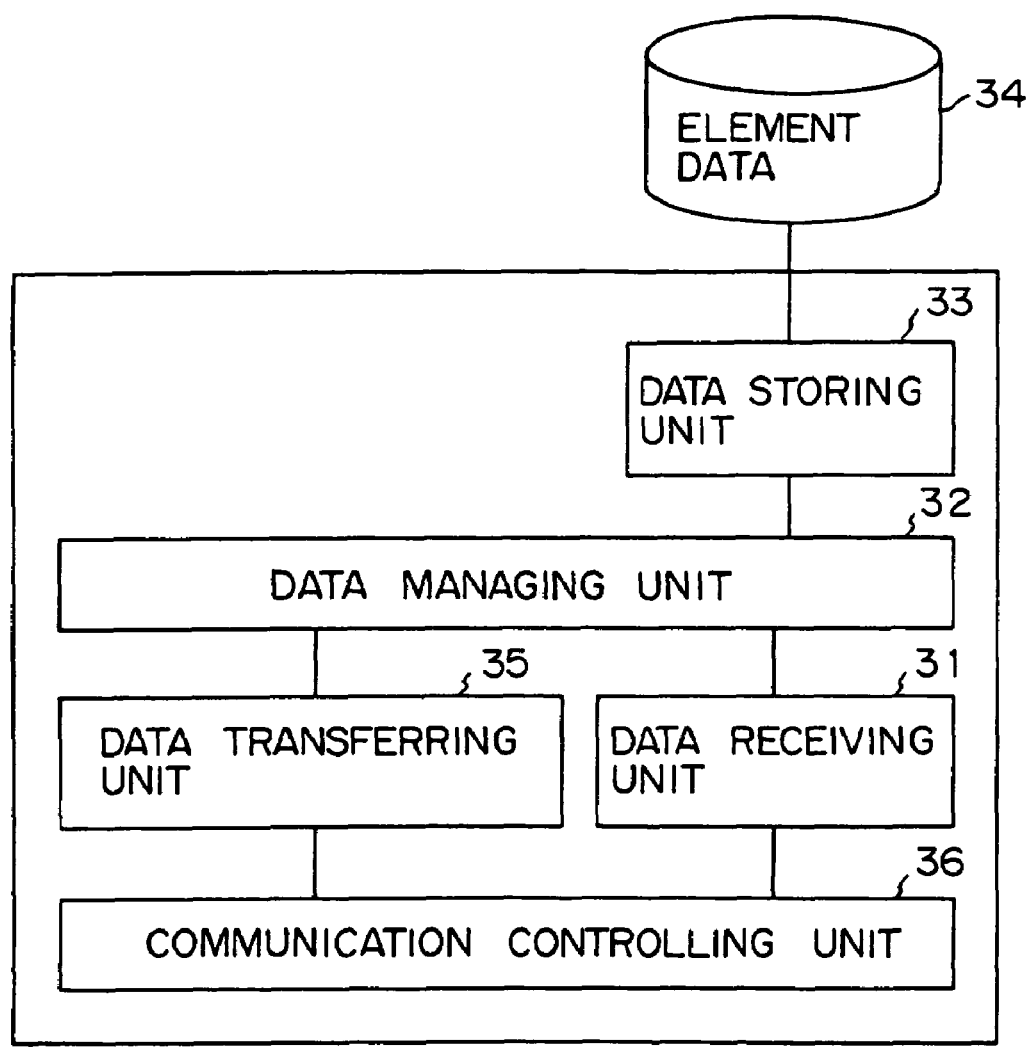
FIG. 7 shows the configuration of a resource system.

FIG. 7 shows the configuration of a resource system. This resource system corresponds to an arbitrary one of the resource systems 3 shown in FIG. 4. The fundamental configuration and operations of the relay system are the same as those of a delivery source system.

A data receiving unit 31 receives a data transfer request transmitted from a delivery source system, a relay system, or a delivery destination system. A data managing unit 32 gives to a data storing unit 33 an instruction to collect element data from a storage medium 34 according to the data transfer request received by the data receiving unit 31. The data managing unit 32 manages the element data collected from the storage medium 34, and gives to a data transferring unit 35 an instruction to return the element data to the system which has issued the data transfer request. The data transferring unit 35 then gives to a communication controlling unit 36 an instruction to return the element data collected from the storage medium 34 to the system which has issued the data transfer request, according to the given instruction. The operations of the data storing unit 33, the storage medium 34, and the communication controlling unit 36 are fundamentally the same as those of the data storing unit 13, the storage medium 14, and the communication controlling unit 17 of the delivery source system shown in FIG. 5. Therefore, their explanations are omitted here.

Figure 8:
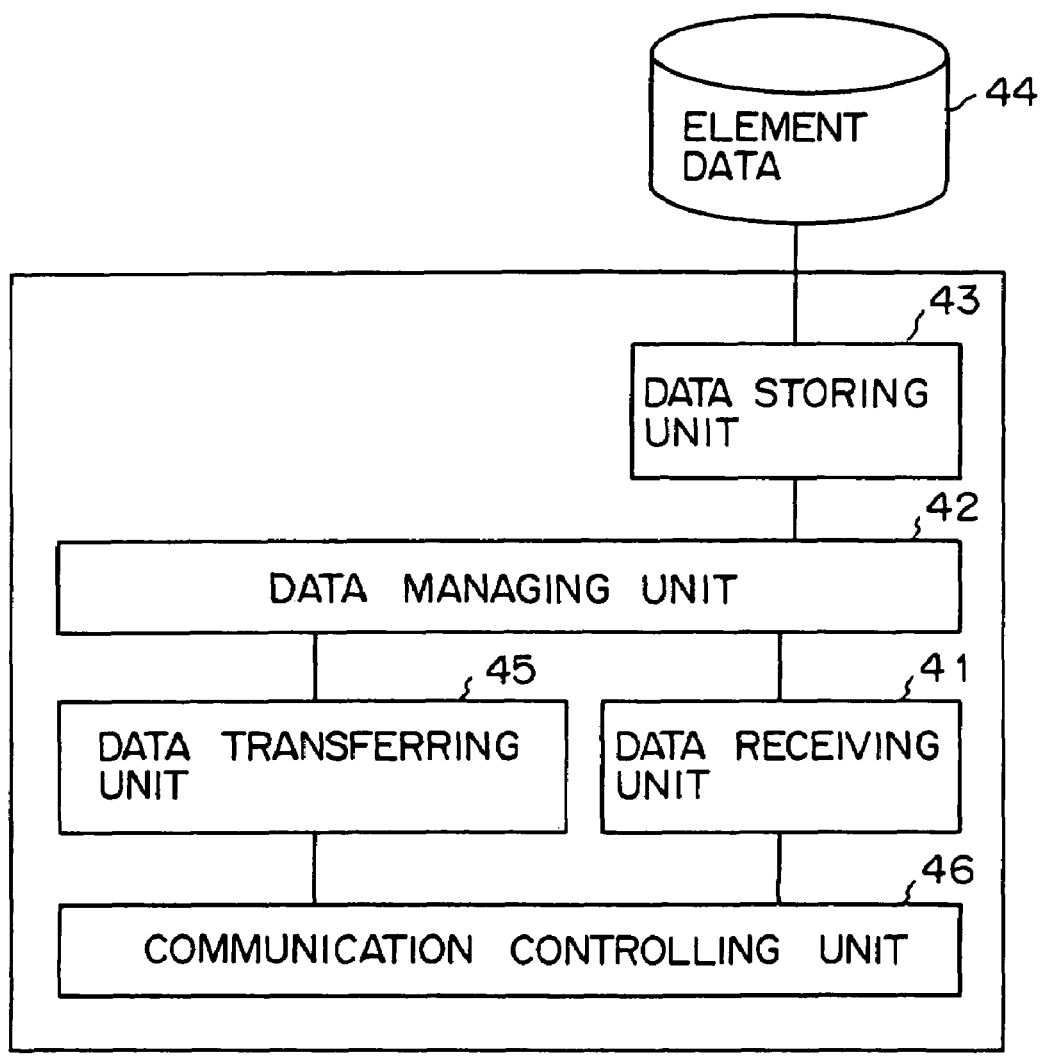
FIG. 8 shows the configuration of a delivery destination system.

FIG. 8 shows the configuration of a delivery destination system. This delivery destination system corresponds to an arbitrary one of the delivery destination systems 4 shown in FIG. 4. The fundamental configuration and operations of the delivery destination system are the same as those of a delivery source system.

A data receiving unit 41 receives the element data and/or the structure information, which are transmitted from a relay system (or a delivery source system). If the structure information is received by the data receiving unit 41, a data managing unit 42 gives to a data storing unit 43 an instruction to collect element data from a storage medium 44 according to the structure information. The data managing unit 4 also gives to a data transferring unit 45 an instruction to collect element data from a resource system. The element data that is transferred from the resource system according to this instruction is received by the data receiving unit 41.

If the structure information is received by the data receiving unit 41, the data managing unit 42 assembles element data received from the relay system (or the delivery source system), the element data collected from the storage medium 44, and the element data collected from the resource system into result data, according to the assembly information in the structure information. In this way, desired data can be obtained.

Figure 9:
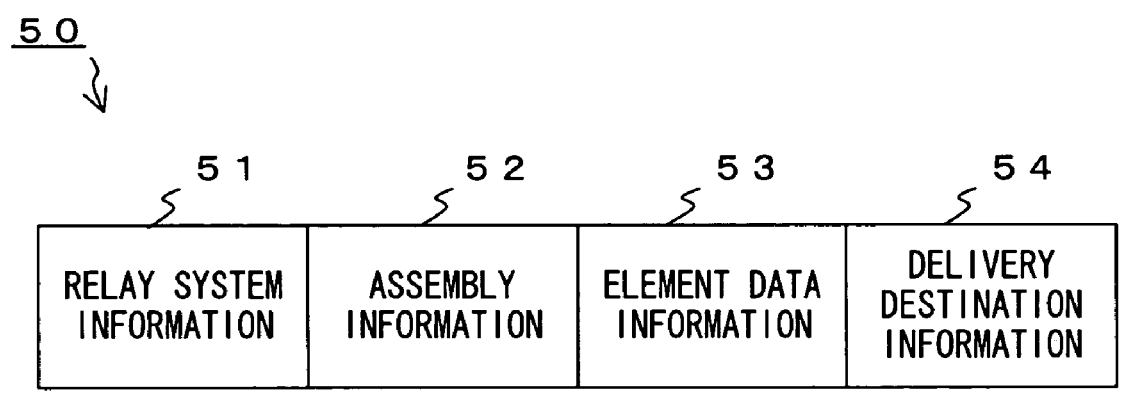
FIG. 9 explains the format of structure information.

FIG. 9 explains the format of structure information. Structure information 50 is fundamentally generated in a delivery source system. The structure information 50 includes relay system information 51, assembly information 52, element data information 53, and delivery destination information 54.

The relay system information 51 is the information about a relay system that is to transmit structure information and element data. As the relay system information 51, for example, the information for identifying the location of a relay system on a network, such as the IP address or the URL name of the relay system, etc. are used. Also a group name for identifying a relay system group composed of a plurality of relay systems, a category name for identifying a relay system group which is classified based on a particular concept, etc. may be used as the relay system information 51.

The assembly information 52 is the information for assembling element data (and/or structure information). As the assembly information 52, for example, "attach", "merge", "compress", etc. are used. The element data information 53 is the information about element data which will be delivered to a delivery destination system. As the element data information 53, for example, the information for identifying the location of a system which stores element data on a network, such as a URL name, etc., and the information for identifying the type of the element data are used.

The delivery destination information 54 is the information about a destination to which element data (and structure information) are to be transmitted. As the delivery destination information 54, the information for identifying the location of a delivery destination system on a network, such as the IP address or the URL name of the delivery destination system, etc. are used. Also a group name for identifying a delivery destination system group composed of a plurality of delivery destination systems, a category name for identifying a delivery destination system group which is classified based on a particular concept, and the like may be used as the delivery destination system information 54.

The data delivery sequence adopted in the data delivering system according to this preferred embodiment will be explained next.

The example shown in FIGS. 10A and 10B is the case where a delivery source system, a relay system and a delivery destination system are provided with a ratio of 1:1:1. Here, a delivery source system 61 delivers data to a delivery destination system 81 via a relay system 71.

FIG. 10A shows structure information generated by the delivery source system 61. In the relay system information in this structure information, the "relay system 71" is set. Furthermore, the "delivery destination system 81" is set in the delivery destination information.

The delivery source system 61 transmits the above described structure information to the relay system 71 as shown in FIG. 10B. Upon receipt of this structure information, the relay system 71 first collects corresponding element data from the storage medium provided with a resource system or the relay system 71 according to element data information-1 through element data information-n. For example, if a URL name is used as the element data information, the relay system 71 obtains the element data from the site identified by the URL name. The relay system 71 then generates complete data to be delivered to the delivery destination system 81 by assembling the collected element data according to the assembly information in the structure information, and transmits the complete data to the delivery destination system 81. In this way, the delivery destination system 81 receives the complete data.

As described above, with this data delivering system, the relay system 71, which receives the structure information, collects the element data to be delivered to the delivery destination system 81, assembles the collected element data, and delivers the assembled data to the delivery destination system 81. Therefore, the delivery source system 61 does not need to collect the data to be delivered to a delivery destination system, so that the load on the delivery source system 61 is light. Furthermore, a storage device for storing the data to be delivered to the delivery destination system 81 can be reduced in size.

When data composed of a plurality of elements is delivered, a plurality of pieces of element data information, and the assembly information for assembling the plurality of pieces of element data may be set in the structure information. Accordingly, a wide variety of data can be delivered.

FIGS. 11A and 11B exemplify the case where the same data is delivered to a plurality of delivery destination systems. That is, the case where a delivery source system, a relay system and delivery destination systems are provided with a ratio of 1:1:m. Here, a delivery source system 61 delivers the same data to delivery destination systems 81-1 through 81-$m$ via a relay system 71.

FIG. 11A shows the structure information generated by the delivery source system 61. The "relay system 71" is set in the relay system information in the structure information. Furthermore, "delivery destination systems 81-1 through 81-$m$" are respectively set in delivery destination information-1 through delivery destination information-m.

The delivery source system 61 transmits the structure information to the relay system 71 as shown in FIG. 11B. Upon receipt of the structure information, the relay system 71 collects corresponding element data according to the element data information-1 through element data information-n, and generates complete data according to assembly information, similar to the method explained by referring to FIGS. 10A and 10B. The relay system 71 then transmits the complete data to the delivery destination systems 81-1 through 81-$m$ according to the delivery destination information-1 through delivery destination information-m. In this way, the delivery destination systems 81-1 through 81-$m$ receive the same complete data.

As described above, the same data can easily be delivered to a plurality of delivery destinations by setting a plurality of pieces of destination information in structure information in this data delivering system.

Figure 12A:
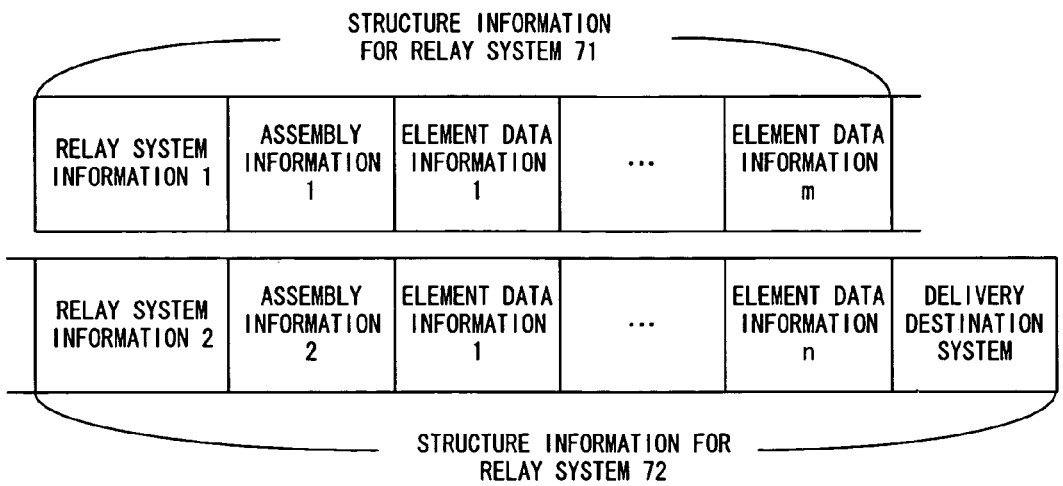
FIG. 12A exemplifies the structure information (No. 3)
Figure 12B:
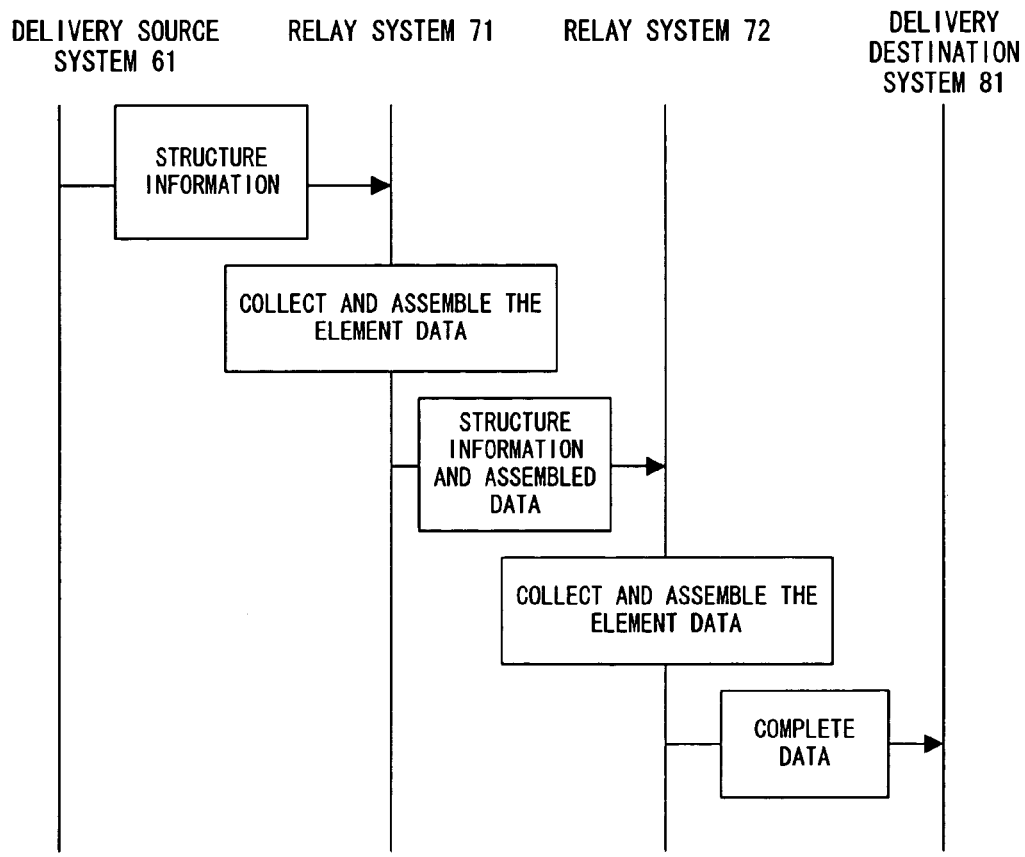
FIG. 12B exemplifies the data delivery sequence (No. 3)

FIGS. 12A and 12B exemplify the case where data is delivered via a plurality of relay systems. Here, a delivery source system 61 delivers data to a delivery destination system 81 via relay systems 71 and 72. In this case, the relay systems 71 and 72 are connected in series between the delivery source system 61 and the delivery destination system 81.

FIG. 12A shows the structure information generated by the delivery source system 61. This structure information is composed of structure information portions respectively for the relay systems 71 and 72. The "relay system 71" is set in the relay system information-1, whereas the "relay system 72" is set in the relay system information-2. Additionally, the "delivery destination system 81" is set in the delivery destination information.

The delivery source system 61 transmits the above described structure information to the relay system 71 as shown in FIG. 12B. Upon receipt of this structure information, the relay system 71 references the structure information portion for the relay system 71, collects element data according to element data information-1 through element data information-m, and assembles the collected element data according to assembly information-1. Furthermore, the relay system 71 transmits updated structure information to the relay system 72 after deleting the structure information portion for the relay system 71 from the received structure information. In this case, the destination is identified by the "relay system 2" in the structure information. Furthermore, the relay system 71 transmits to the relay system 72 also the element data (assembled data) assembled according to the assembly information-1.

Upon receipt of the structure information and the assembled data from the relay system 71, the relay system 72 executes the process complying with the structure information. Namely, the relay system 72 collects element data according to element data information-1 through element data information-n, and assembles the element data according to assembly information-2. Furthermore, the relay system 72 transmits to the delivery destination system 81 the assembled data received from the relay system 71 and the assembled data that the relay system 72 itself collects and assembles according to delivery destination information in the structure information. In this way, the delivery destination system 81 receives the data which are collected and assembled respectively by the relay systems 71 and 72.

Note that the element data information-1 through element data information-m set in the structure information portion for the relay system 71, and the element data information-1 through element data information-n set in the structure information portion for the relay system 72 are fundamentally different from one another. However, some of them may be duplicate.

As described above, with this data delivering system, a plurality of relay systems, which connected in many stages, respectively collect and assemble element data according to structure information. Therefore, a delivery process is distributed, leading to an increase in a data delivery efficiency. Especially, loads on a relay system, a resource system, and a delivery destination system are optimized, so that the data delivery efficiency will further increase. As a method for distributing the loads, for example, a method equalizing the total amount of element data collected by each relay system, a method making a relay system, which is close to the storage location of element data to be collected, collect the element data, and the like are considered.

Figure 13:
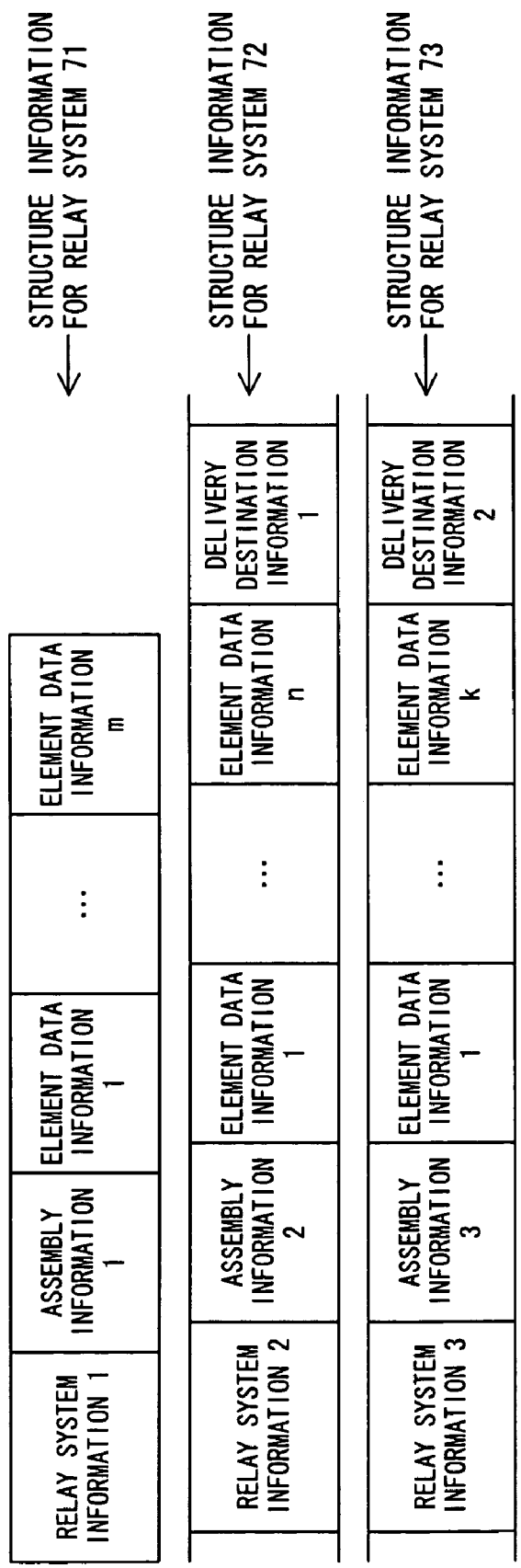
FIG. 13 exemplifies the structure information (No. 4)
Figure 14:
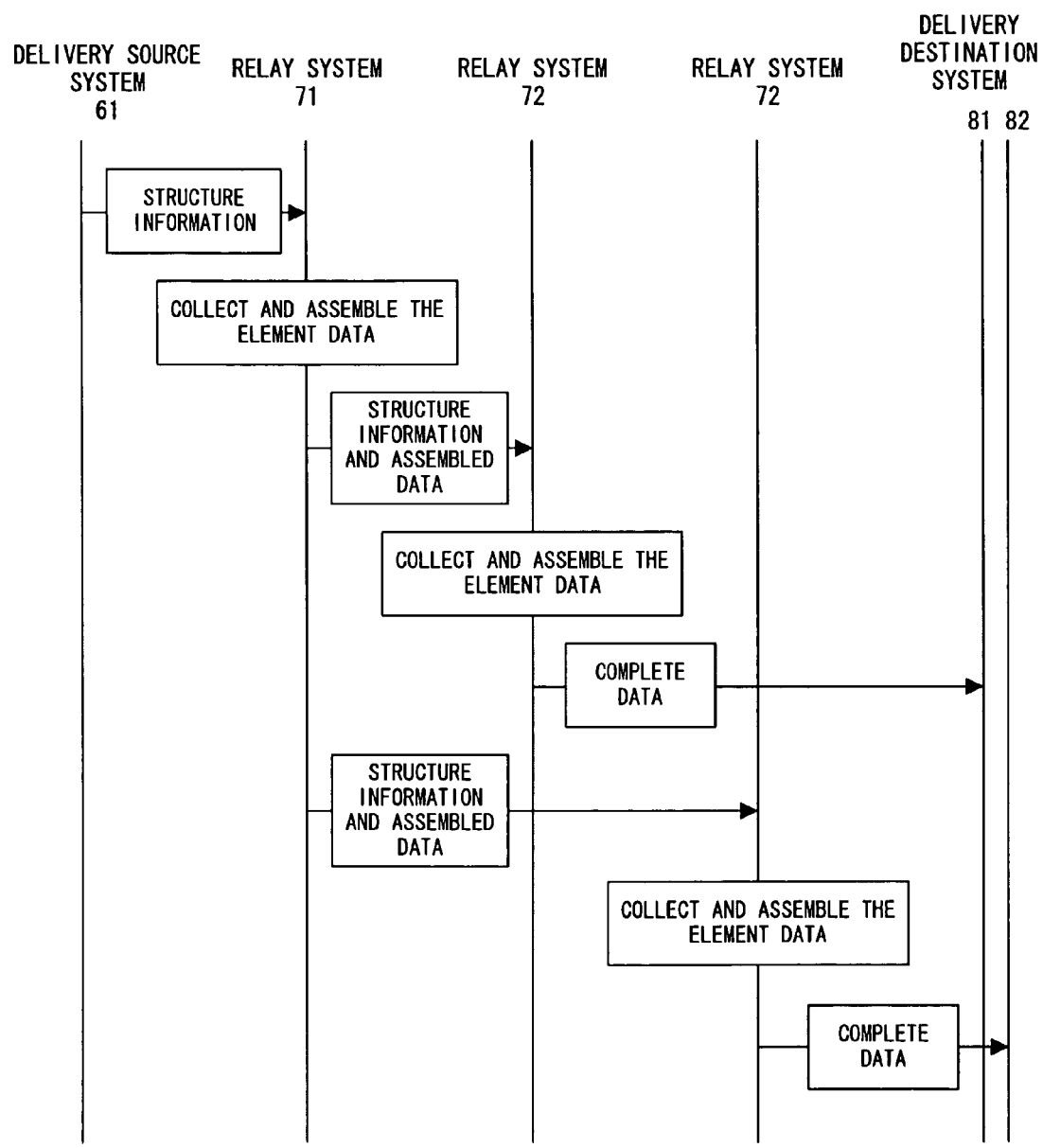
FIG. 14 exemplifies the data delivery sequence (No. 4)

FIGS. 13 and 14 exemplify the case where data including a common portion is delivered to a plurality of delivery destination devices. Here, a delivery source system 61 delivers data to a delivery destination system 81 via relay systems 71 and 72, and also delivers data to a delivery destination system 82 via relay systems 71 and 73. Namely, the relay systems 71 through 73 form a tree structure.

FIG. 13 shows the structure information generated by the delivery source system 61. This structure information is composed of the structure information portions respectively for the relay systems 71, 72, and 73. The "relay systems 71 through 73" are respectively set in relay system information-1 through relay system information-3. Here, the relay system information-2 and relay system information-3 are assumed to be described as relay systems on the same level. Furthermore, the "delivery destination systems 81 and 82" are respectively set in the delivery destination information 1 and delivery destination information-2.

The delivery source system 61 transmits the above described structure information to the relay system 71 as shown in FIG. 14. Upon receipt of this structure information, the relay system 71 references the structure information portion for the relay system 71, collects element data according to element data information-1 through element data information-m, and assembles the collected element data according to assembly information-1. Then, since there lay system information-2 and relay system information-3 are described as the relay systems on the same level, the relay system 71 transmits to the relay system 72 the structure information portion for the relay system 72 and also transmits to the relay system 73 the structure information portion for the relay system 73. In this case, the destinations are respectively identified by the relay system information-2 and relay system information-3 in the structure information. Additionally, the relay system 71 transmits the element data (assembled data) after being assembled according to the assembly information-1 to the relay systems 72 and 73.

Upon receipt of the structure information and the assembled data from the relay system 71, the relay system 72 collects element data according to element data information-1 through element data information-n, and assembles the collected element data according to assembly information-2 in a similar manner as in the case explained by referring to FIG. 12B. Furthermore, the relay system 72 transmits to the delivery destination system 81 the assembled data received from the relay system 71 and the assembled data that the relay system 72 itself collects and assembles according to the delivery destination information-1 in the structure information. In this way, the delivery destination system 81 receives the data which are collected and assembled respectively by the relay systems 71 and 72.

The operations of the relay system 73 are fundamentally the same as those of the relay system 72. Note that, however, there lay system 73 collects element data according to element data information-1 through element data information-k, and assembles the element data according to assembly information-3. Furthermore, the relay system 73 transmits to the delivery destination system 82 the assembled data received from the relay system 71 and the assembled data which is collected and assembled by the relay system 73. In this way, the delivery destination system 82 receives the data which are collected and assembled respectively by the relay systems 71 and 73.

As described above, this data delivering system provides with a plurality of relay systems, which are connected in a tree state, and common element data to be delivered to a plurality of delivery destination systems is collected by one relay system, and a plurality sets of element data that differ depending on each delivery destination system are collected by different relay systems. Accordingly, common element data which is delivered to a plurality of delivery destination systems is never be collected and delivered repeatedly, leading to an increase in a data delivery efficiency.

FIGS. 15A and 15B exemplify the case where a delivery source system itself collects element data, and transmits the collected data to a delivery destination system. Here, a delivery source system 61 delivers data to a delivery destination system 81 not via a relay system.

FIG. 15A shows the structure information generated by the delivery source system 61. The "delivery source system 61" is set in relay system information in this structure information. Additionally, the "delivery destination system 81" is set in the delivery destination information.

Since the "delivery source system 61" is set in the relay system information in the structure information, the delivery source system 61 collects and assembles element data as shown in FIG. 15B. That is, the delivery source system 61 collects element data according to element data information-1 through element data information-n, and assembles the collected element data according to assembly information. Then, the delivery source system 61 transmits the assembled element data (complete data) to the delivery destination system 81 according to the delivery destination information. In this way, the delivery destination system 81 receives the data which is delivered from the delivery source system 61.

Figure 2:
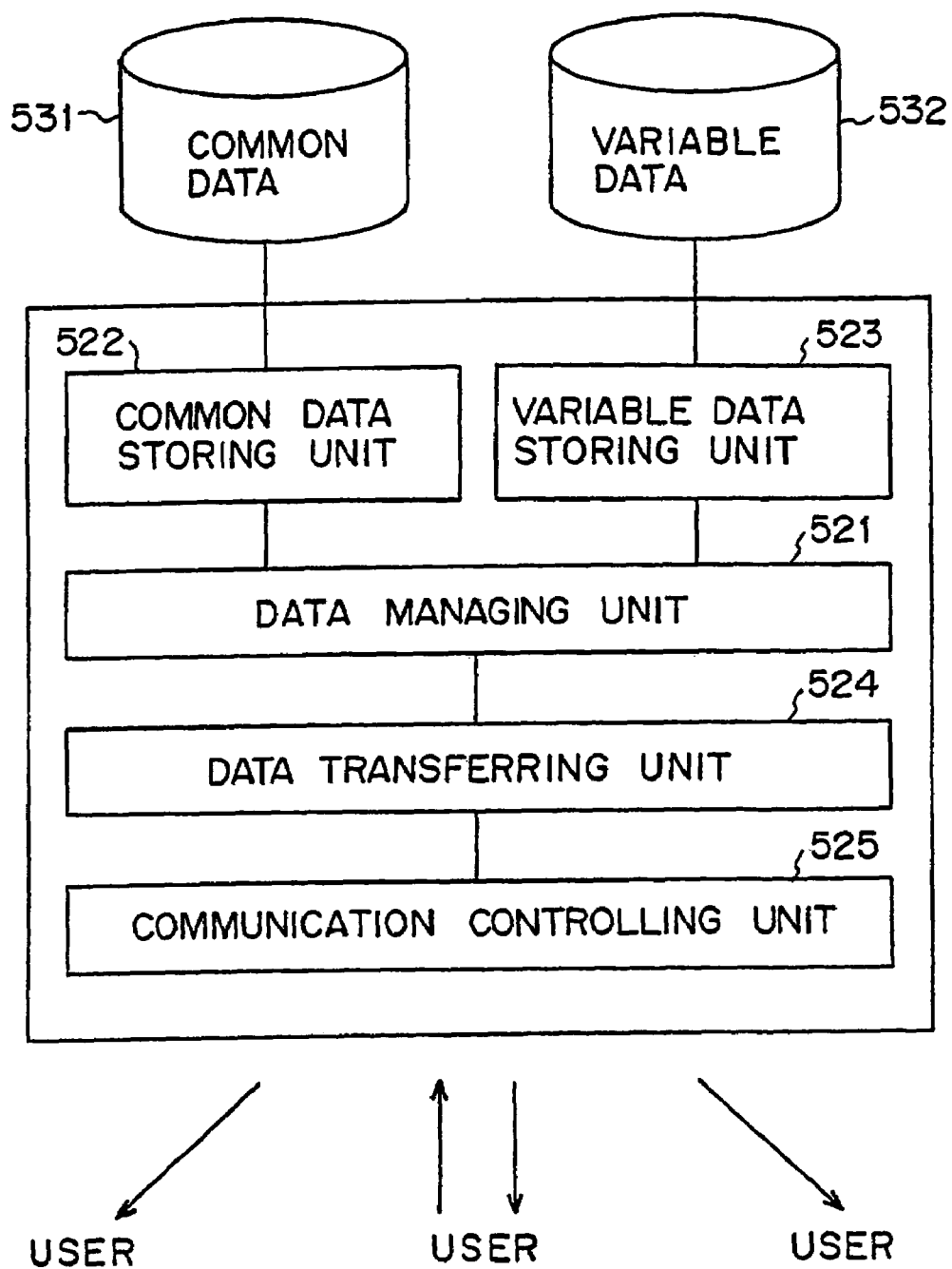
FIG. 2 explains an existing data delivering system with a merging capability.
Figures 3A, 3B:
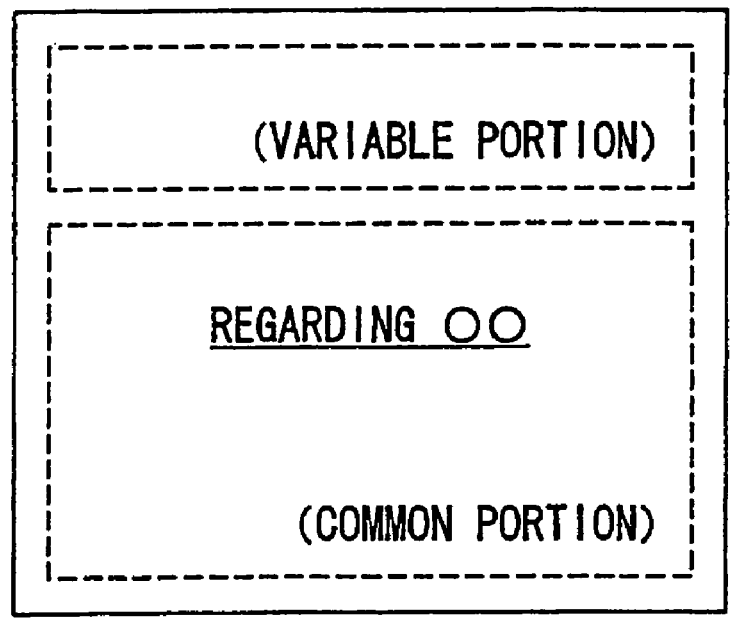
FIG. 3A exemplifies combined data.
FIG. 3B exemplifies variable data.

As described above, with this data delivering system, a delivery source system can collect and assemble element data by setting the delivery source system itself as relay system information in structure information with the same method as any of those implementing the data delivery, which are shown in FIGS. 10 through 14. As a result, the merging capability explained as a conventional technique by referring to FIGS. 2, 3A, and 3B can easily be implemented.

Figure 16:
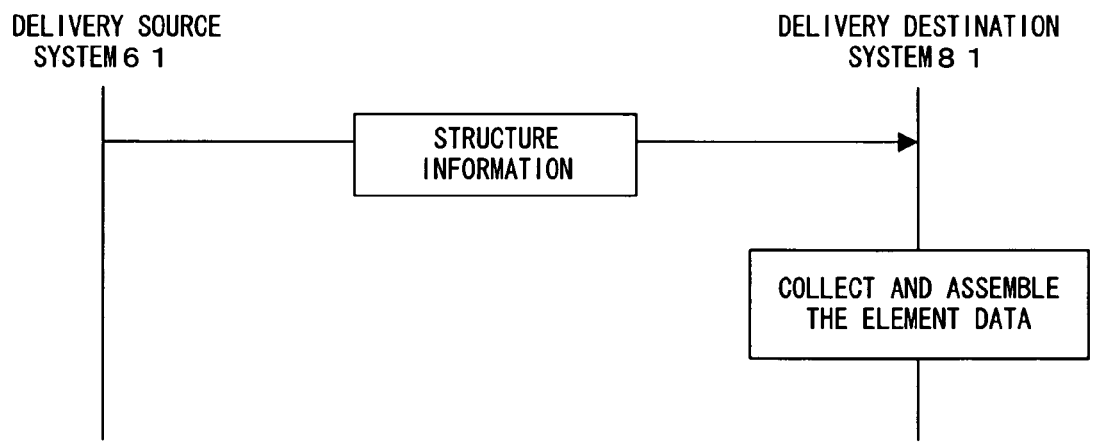
FIG. 16A exemplifies the structure information (No. 6)
FIG. 16B exemplifies the data delivery sequence (No. 6)

FIGS. 16A and 16B exemplify the case where only an instruction to collect and assemble element data is delivered from a delivery source system to a delivery destination system, and the delivery destination system collects and assembles element data according to this instruction. Here, the instruction (structure information) is delivered from a delivery source system 61 to a delivery destination system 81, and the delivery destination system 81 collects and assembles element data according to this instruction.

FIG. 16A shows the structure information generated by the delivery source system 61. In both relay system information and delivery destination information in this structure information, the "delivery destination system 81" is set.

The delivery source system 61 transmits the above described structure information to the delivery destination system 81 as shown in FIG. 16B. Since the "delivery destination system 81" is set as the relay system information, the delivery destination system 81 collects and assembles element data upon receipt of this structure information. Namely, the delivery destination system 81 collects element data according to element data information-1 through element data information-n, and assembles the collected element data according to assembly information. In this way, the delivery destination system 81 obtains desired data.

With this data delivering system, a delivery source system only transmits an instruction to collect and assemble element data to a delivery destination system as described above, so that the load on the delivery source system is light.

Next, the operations of a delivery source system, a relay system, a resource system, and a delivery destination system are respectively explained by referring to flowcharts. In the following explanations, data which is assembled from a part of desired element data and is to be delivered to a delivery destination system is referred to as "assembled data", and final data which is assembled from all desired element data and is to be delivered to a delivery destination system is referred to as "complete data".

Figure 17:
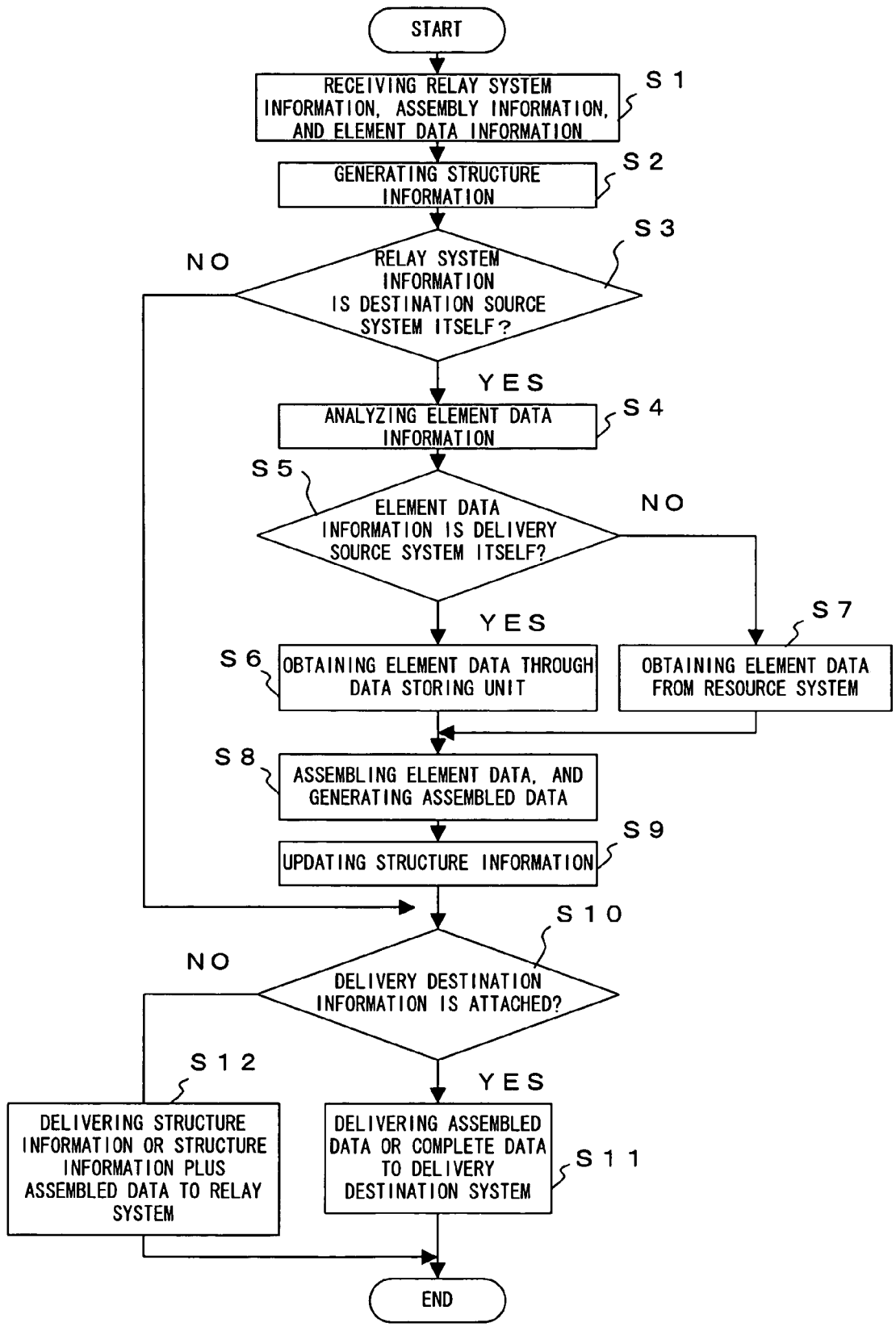
FIG. 17 is a flowchart explaining the operations of the delivery source system.

FIG. 17 is a flowchart explaining the operations of a delivery source system. This process is executed upon receipt of a data delivery request issued from a user, or at the start of a spontaneous data delivery. A delivery source system spontaneously starts a data delivery, for example, in the case where newspaper data is delivered to a subscriber who makes a contract to receive a newspaper as electronic data at a predetermined time every day.

In step S1, (1) information for identifying a storage location of element data to be delivered to a delivery destination system (element data information), (2) information for assembling the element information (assembly information), and (3) information for identifying a system which collects the element data (relay system information) are generated based on a data delivery request from a user or preregistered information. In step S2, structure information is generated by attaching the delivery destination information for identifying a delivery destination system to the information generated in step S1.

In step S3, it is examined whether or not a delivery source system itself is set as the relay information in the structure information. If the delivery source system is set as the relay system information, the process goes to step S4. Otherwise, the process skips steps S4 through S9.

In step S4, the element data information in the structure information is analyzed. In step S5, it is examined whether or not the delivery source system is set as the element data information. If the delivery source system is set as the element data information, corresponding element data is obtained form a storage medium (the storage medium 14 shown in FIG. 5) comprised by the delivery source system in step S6. At this time, the data storing unit 13 shown in FIG. 5 is started up. If the delivery source system is not set as the element data information, corresponding element data is obtained from the resource system identified by the element data information in step S7. If both of the delivery source system itself and a resource system are set as the element data information, the operations in both of steps S6 and S7 are performed.

In step S8, the element data obtained in step S6 and/or step S7 is assembled according to assembly information. In this way, assembled data or complete data is generated. In step S9, the structure information is updated. Specifically, the data portion for the delivery source system is deleted from the structure information generated in step S2.

In step S10, it is examined whether or not delivery destination information is attached to the structure information portion for the delivery source system. If the delivery destination information is attached to the structure information portion for the delivery source system, the assembled data or complete data generated in step S8 is delivered to the delivery destination system according to the delivery destination information in step S11. If the delivery destination information is not attached to the structure information portion for the delivery source system, the structure information or the structure information plus assembled data is delivered to a corresponding relay system according to the relay system information. If step S6 and/or step S7 is executed, the structure information plus assembled data is transmitted. If these steps are not executed, only the structure information is transmitted.

As described above, the delivery source system generates structure information, and transmits the structure information or the structure information plus assembled data according to the structure information. If the delivery source system itself is set as the relay system information as in the example shown in FIG. 15A, steps S4 through S9 of this flowchart are executed.

FIG. 18 is a flowchart explaining the operations of a relay system. The process of this flowchart is executed when structure information or structure information plus assembled data is received from a delivery source system or a super ordinate relay system.

In step S21, structure information or structure information plus assembled data is received. For example, the relay system 2a shown in FIG. 4 receives these data from the delivery source system 1. In the meantime, for example, the relay system 2b or 2c shown in FIG. 4 receives these data from the relay system 2a.

The operations in step S22 through S30 are fundamentally the same as those in steps S4 through S12, which are shown as the operations of the delivery source system in FIG. 17. Note that, however, element data is obtained from the storage medium (the storage medium 24 shown in FIG. 6) comprised by the relay system in step S24. In step S30, the structure information or the structure information plus assembled data is transmitted to a subordinate (downstream) relay system.

For instance, if a plurality of pieces of delivery destination information are set in the structure information as in the example shown in FIG. 11A, the same delivery data is transmitted to the delivery destination systems identified by the plurality of pieces of delivery destination information in step S29. Furthermore, for instance, if a plurality of pieces of relay system information are described as relay systems on the same level as in the example shown in FIGS. 13 and 14, the same data (structure information or structure information plus assembled data) is delivered to the respective relay systems identified by the plurality of pieces of relay system information in step S30.

As described above, the relay system collects and assembles element data according to structure information upon receipt of the structure information, and delivers the element data to a delivery destination system or its subordinate relay system.

Figure 19:
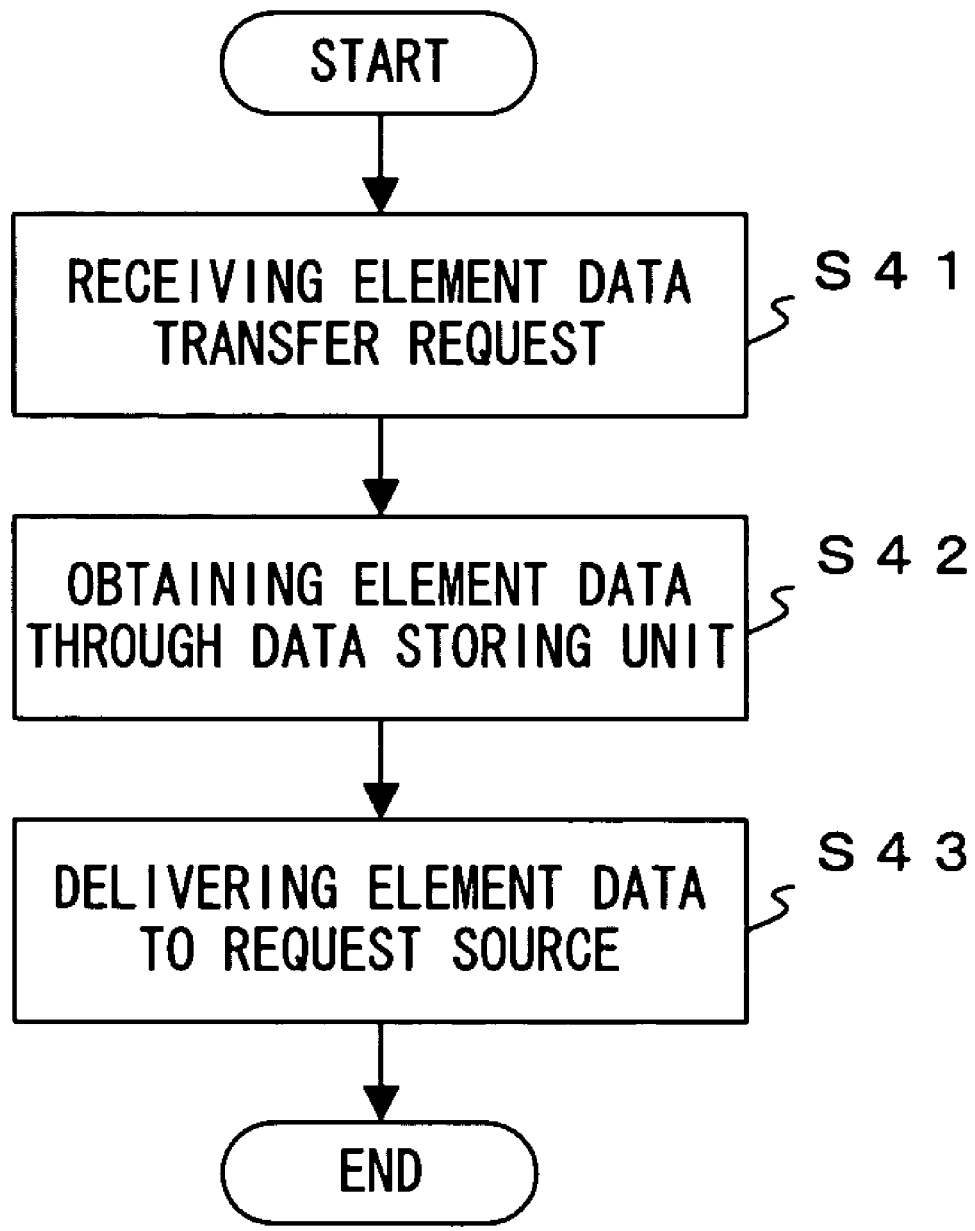
FIG. 19 is a flowchart showing the operations of the resource system.

FIG. 19 is a flowchart showing the operations of a resource system. The process of this flowchart is executed upon receipt of an element data transfer request issued from a delivery source system, a relay system, or a delivery destination system.

In step S41, the element data transfer request is received from the delivery source system, the relay system, or the delivery destination system. In step S42, corresponding element data is obtained from the storage medium (the storage medium 34 shown in FIG. 7) comprised by the resource system according to the received data transfer request. At this time, the data storing unit 33 shown in FIG. 7 is started up. Then, in step S43, the obtained element data is returned to the system which has issued the data transfer request. As described above, the resource system provides corresponding element data according to a data transfer request.

Figure 20:
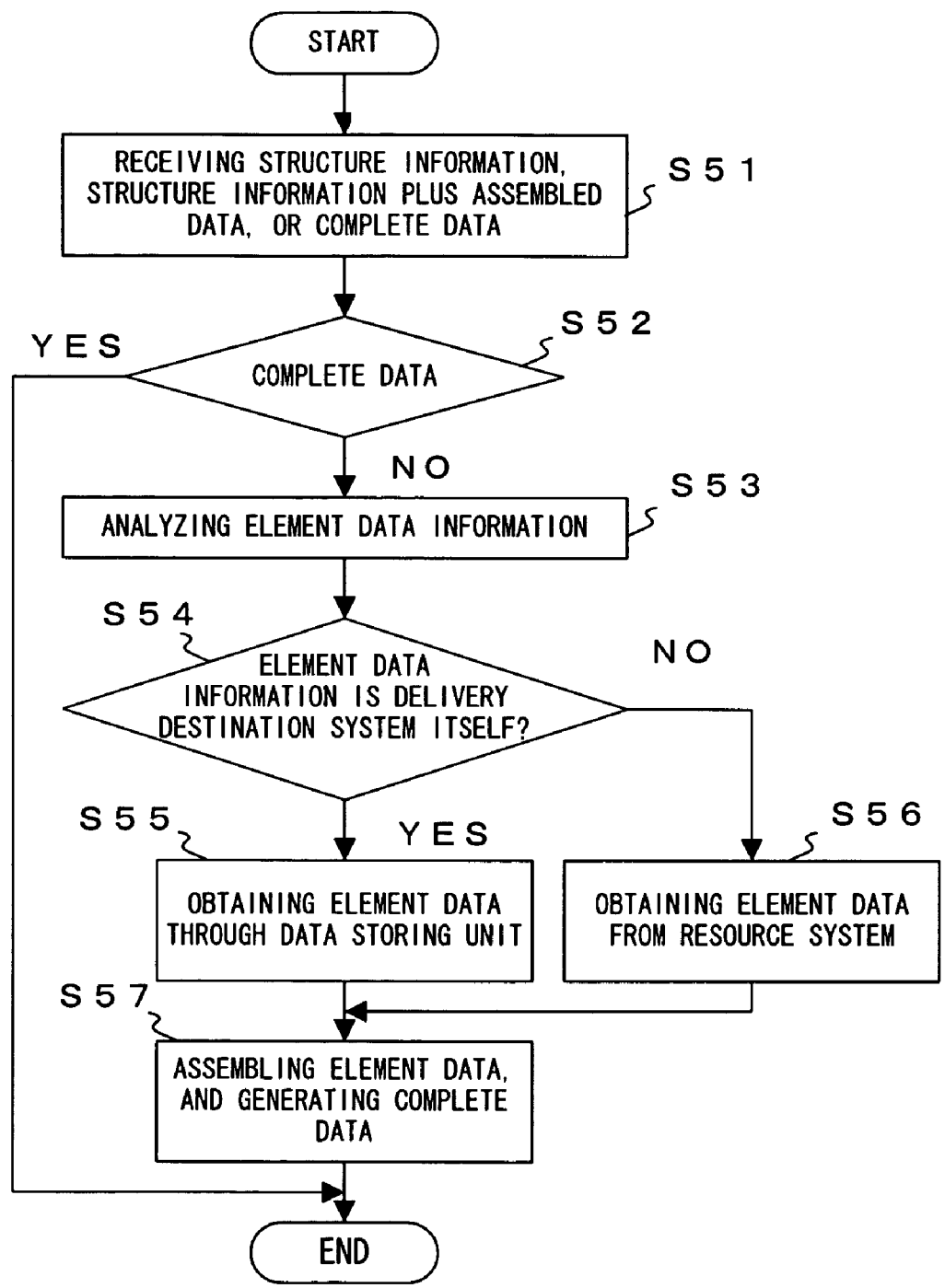
FIG. 20 is a flowchart showing the operations of the delivery destination system.
Figure 21:
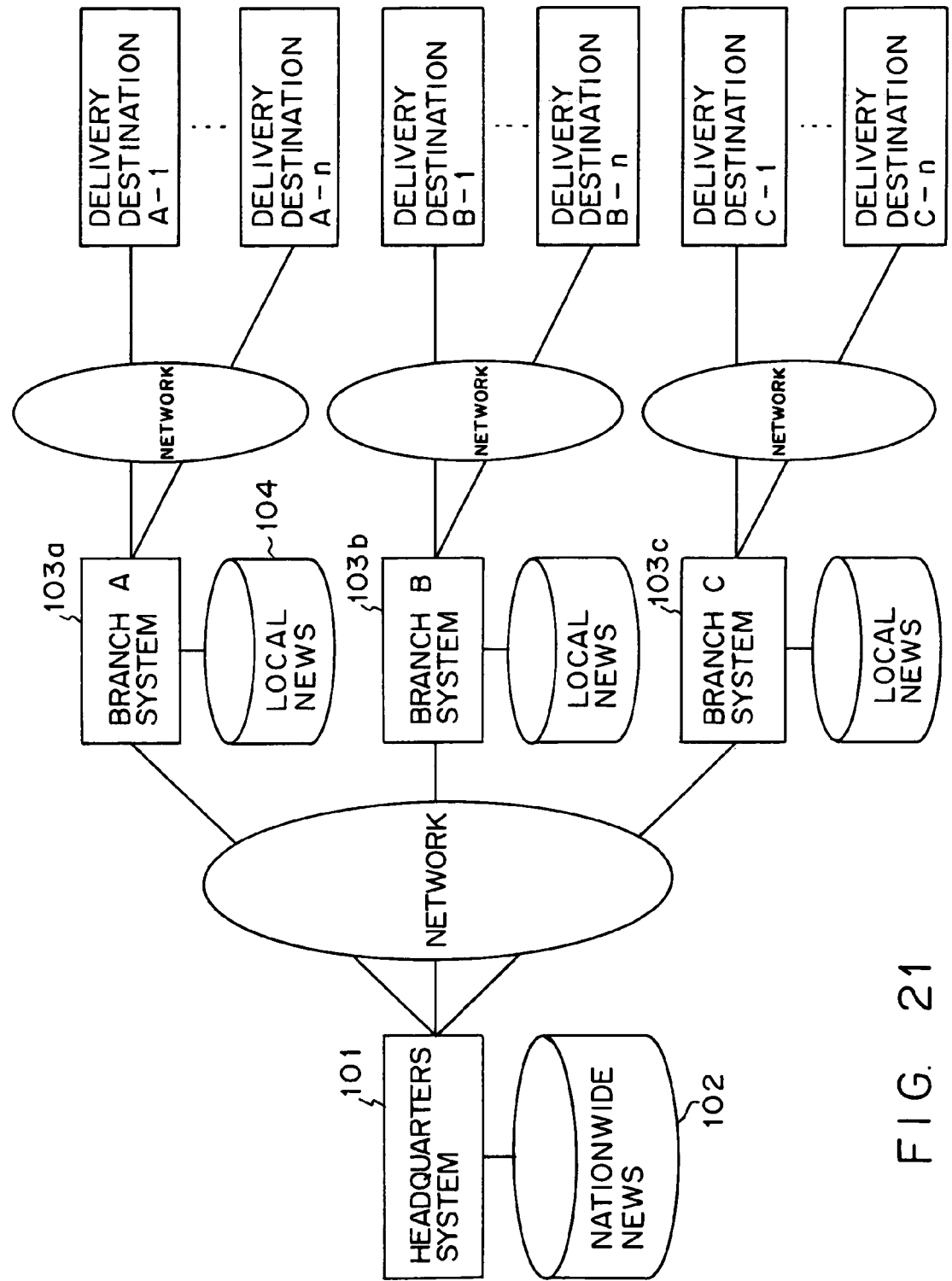
FIG. 21 shows the whole of a system according to a first embodiment.

FIG. 20 is a flowchart showing the operations of a delivery destination system. The process of this flowchart is executed upon receipt of structure information, structure information plus assembled data, or complete data from a delivery source system or a relay system.

In step S51, the structure information, the structure information plus assembled data, or the complete data is received. By way of example, the delivery destination system 81 shown in FIG. 10 receives delivery data from the relay system 71. Additionally, for instance, the delivery destination system 81 shown in FIG. 15 receives complete data from the delivery source system 61. Furthermore, by way of example, the delivery destination system 81 shown in FIG. 16 receives structure information from the delivery source system 61.

In step S52, it is examined whether or not the received data is complete data. This examination is made by determining whether or not structure information is received. That is to say, if the structure information is not received, it is regarded that complete data is received and the process is terminated. If the structure information is received, the operations in and after step S53 are executed.

The operations in steps S53 through S57 are fundamentally the same as those in steps S4 through S8, which are shown as the operations of the delivery source system shown in FIG. 17. Note that, however, element data is obtained from the storage medium (the storage medium 44 shown in FIG. 8) comprised by the delivery destination system in step S55.

As described above, the delivery destination system receives complete data from the delivery source system or the relay system, or obtains complete data according to received structure information.

Next, more specific embodiments of the data delivering method according to the present invention will be described.

First Embodiment

Figure 15:
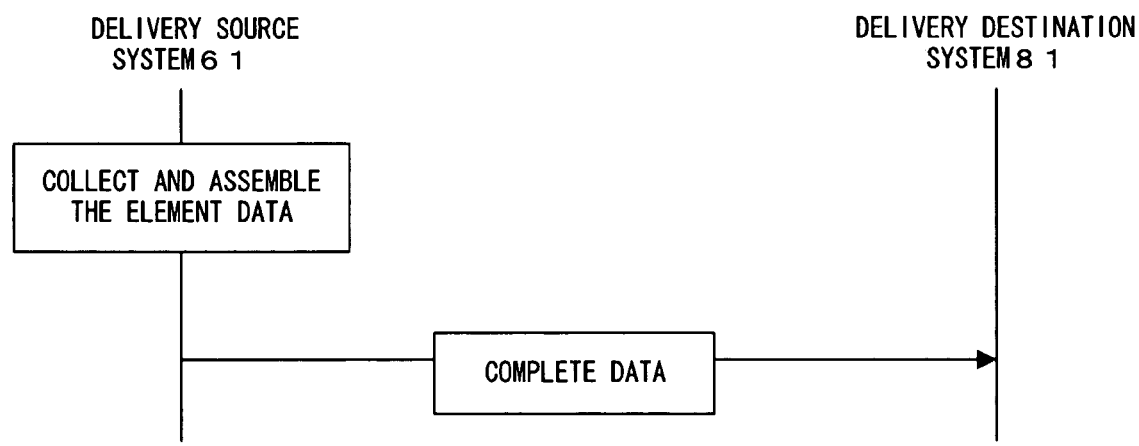
FIG. 15A exemplifies the structure information (No. 5)
FIG. 15B exemplifies the data delivery sequence (No. 5)

The first embodiment relates to a newspaper delivering system which delivers newspaper articles to subscribers as electronic data. The data delivering method shown in FIGS. 13 through 15 is used in this system.

With this newspaper delivering system, each subscriber can receive nationwide and local news. To implement such a data delivery, a headquarters system 101 provides all of subscribers with the nationwide news to be delivered, and branch systems 103a through 103c (a branch-A system 103a through a branch-C system 103c) respectively provide the subscribers with local news. Here, the headquarters system 101 functions as a delivery source system, whereas the branch systems 103a through 103c function as relay systems respectively.

FIG. 22 exemplifies the structure information used in the first embodiment. This structure information includes the structure information portion for the headquarter system 101, and the structure information portions for the respective branch systems 103a through 103c.

In the structure information portion for the headquarters system 101, the "headquarters system", "attach", and "nationwide news" are respectively set as relay system information, assembly information, and element data information. Accordingly, the headquarters system 101 itself obtains the nationwide news, and delivers the obtained news to the branch systems 103a through 103c. Here, the nationwide news is assumed to be stored in a resource system 102. Furthermore, since the relay system information in the structure information portions for the respective branch systems 103a through 103c are described as relay systems on the same level, the headquarters system 101 transmits the respective structure information portions to the branch systems 103a through 103c.

The branch system 103a (branch-A system) receives the nationwide news, and the structure information portion for the branch system 103a. "Assembled data plus local news" and "local news" are respectively set as assembly information and element data information in the structure information portion for the branch system 103a. Here, the "assembled data" is the "nationwide news". Accordingly, the branch system 103a obtains the "local news" from the resource system 104, and assembles complete data from the "nationwide news" received from the headquarters system 101 and the "local news". The branch system 103a then delivers the nationwide news and the local news to the respective subscribers (delivery destinations A-1 through A-n) according to the delivery destination information in the structure information portion.

In this way, the subscribers (delivery destinations A-1 through A-n) who make contracts with the branch-A can receive the "nationwide news" prepared by the headquarters and the "local news" prepared by the branch-A. Remember that similar deliveries are made by the branch-B and branch-C.

As described above, with the newspaper delivering system according to the first embodiment, data that differs depending on each delivery destination can be attached to common data when the common data is delivered to a plurality of delivery destinations.

The above described embodiment assumes that the headquarters system 101 recognizes all of delivery destinations. However, the headquarters system 101 does not always need to recognize all of delivery destinations. For example, if subscriber information is managed by the branch systems 103a through 103c, the headquarters system 101 sets the information for identifying a group to which a plurality of delivery destinations belong, as the delivery destination information in the structure information, which is to be notified to the branch systems 103a through 103c, as shown in FIG. 23.

The branch systems 103a through 103c respectively possess a delivery destination list for managing delivery destinations. The delivery destination list possessed by the branch system 103a is exemplified in FIG. 24. By way of example, upon receiving from the headquarters system 101 the structure information in which "subscribers" are set as delivery destination information, the branch system 103 a references the delivery destination list and delivers corresponding data to the delivery destinations A-1 through A-n.

Figure 25:
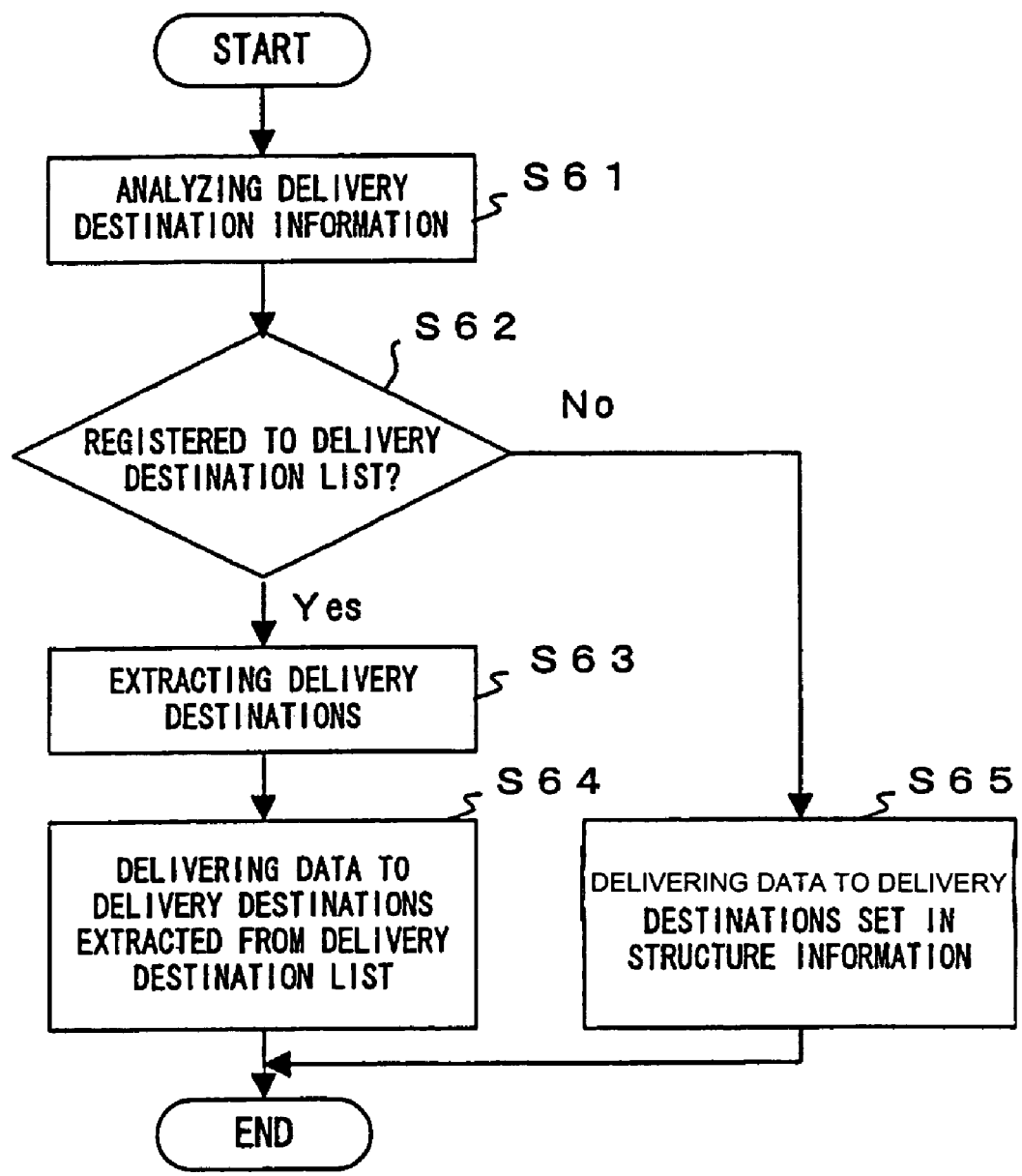
FIG. 25 is a flowchart showing the operations of a relay system when a group is set as delivery destination information.
Figure 27:
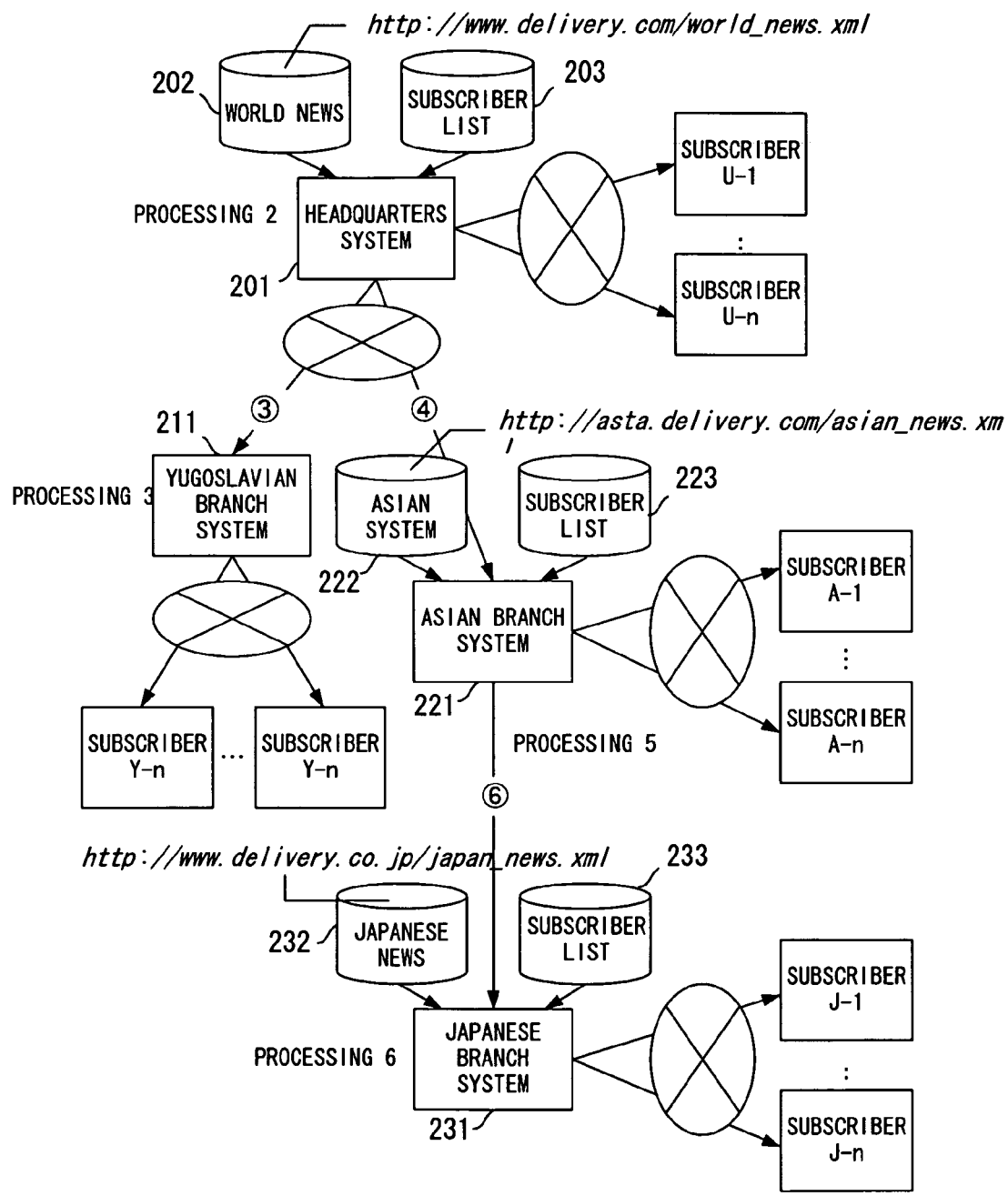
FIG. 27 shows the whole of a system according to a third embodiment.

FIG. 25 is a flowchart explaining the operations of a relay system upon receipt of structure information in which a group is set as delivery destination information. It should be remembered that the process for collecting and assembling element data is omitted from this flowchart.

In step S61, delivery destination information in the received structure information is analyzed. In step S62, it is examined whether or not the delivery destination information is registered as a group name included in a delivery destination list. If the information is registered as a group name, all of delivery destinations corresponding to the group name are extracted from the delivery destination list in step S63. In step S64, corresponding data is transmitted to the respective delivery destinations extracted from the delivery destination list. If the delivery destination information in the received structure information is not registered to the delivery destination list, corresponding data is transmitted to delivery destinations according to the delivery destination information in step S65. The operations in steps S61 through S63 are executed by the inquiring unit 25 shown in FIG. 6. Furthermore, the delivery destination list is stored in a destination database 27.

A method specifying a plurality of delivery destinations by using a delivery destination group may be utilized in various forms in addition to a newspaper delivering system. This method is also useful, for example, when an in-house newsletter is transmitted from headquarters to branches, sales offices, plants, etc. In this case, the headquarters does not need to set each employee address in structure information, and may only set the information representing "employees" as delivery destination information. This is similar also when each branch forwards a received in-house newsletter to its subordinate sales offices. Then, each branch, each sales office, and each plant deliver the in-house newsletter to employees who belong thereto.

The above described example refers to the case where delivery destinations are put into groups. However, relay systems may be put into groups alternatively. For example, the relay systems 72 and 73 may be put into a group in the example shown in FIG. 14. In this case, the delivery source system 61 regards the relay systems 72 and 73 as one group, and sets the information for identifying the group in structure information. Additionally, the relay system 71 possesses a relay system list for managing the grouping of relay systems, and delivers corresponding data to a plurality of relay systems by using this list.

Second Embodiment

The second embodiment relates to an operational data delivering system which delivers the information about operations from a general affairs division in a company to respective employees. This system utilizes the data delivering method shown in FIGS. 15 and 16.

The operational data delivering system according to this embodiment assumes that templates (such as a spreadsheet format) of a job achievement (business performance) report, an in-office memo, a business trip expense adjustment statement are distributed to employees beforehand. These templates may be distributed by using a storage medium such as a CD-ROM, a floppy disk, etc., or via a network. In either case, these templates are assumed to be prestored onto a storage medium 114 (hard disk, etc.) comprised by a terminal 113 for each employee. A general affairs division system 111 periodically delivers the raw data of the job achievement report, the in-office memo, and the business trip expense adjustment statement to each employee, and the employees display the received data by using the templates which are distributed beforehand.

To implement this data delivery, the general affairs division system 111 generates the structure information shown in FIG. 26B, and performs a data delivery according to the structure information. In this example, since the "general affairs division system" is set as the relay system information in the structure information, the general affairs division system 111 collects job achievement data, in-office memo data, and business trip expenses adjustment data from the resource system 112, and delivers the collected data to the terminal 113. At this time, the general affairs division system 111 notifies the terminal 113 of the structure information for the terminal 113.

Upon receipt of this structure information, the terminal 113 extracts a corresponding template from the storage medium 114 according to the element data information, and embeds the job achievement data, the in-office memo data, or the business trip expense adjustment data into the template according to assembly information. In this way, an employee-A can view the job achievement report, the in-office memo, or the business trip expense adjustment statement in the predetermined format.

As described above, with the system according to this embodiment, not fixed data but only variable data is delivered, which leads to a high data transfer efficiency.

Third Embodiment

The third embodiment relates to a newspaper delivering system which delivers newspaper articles to subscribers as electronic data. In this system, the structure data is described in an XML (eXtensible Markup Language).

With this newspaper delivering system, world news is delivered from headquarters to branches, and is further delivered to subscribers after local news (Asian news, Japanese news, or the like) is attached by each of the branches depending on need.

Specifically, a headquarters system 201 is arranged in New York, and comprises a database 202 for storing "world news". Additionally, the headquarters system 201 comprises a subscriber list 203 for storing subscriber information (including addresses). This subscriber list 203 stores the information of United States and Yugoslavian subscribers. The headquarters system 201 delivers "world news" to U.S. subscribers U-1 through U-n, and also delivers the news to a Yugoslavian branch system 211 and an Asian branch system 221.

The Yugoslavian branch system 211 delivers the "world news" received from the headquarters system 201 to the Yugoslavian subscribers Y-1 through Y-n. Addresses of delivery destinations, etc. are provided from the headquarters system 201.

The Asian branch system 221 comprises a database 222 for storing "Asian news", and a subscriber list 223 for storing the information of subscribers in Asian areas except for Japan. The Asian branch system 221 attaches the "Asian news" to the "world news" received from the headquarters system 201, delivers the set of news to subscribers A-1 through A-n in the Asian areas, and also delivers the them to a Japanese branch system 231.

The Japanese branch system 231 comprises a database 232 for storing "Japanese news", and a subscriber list for storing the information of subscribers inside Japan. The Japanese branch system 231 attaches "Japanese news" to the "world news" and "Asian news" received from the Asian branch system 221, and delivers the set of news to the subscribers J-1 through J-n inside Japan.

To implement the above described data delivery, the headquarters system 201 generates the structure information shown in FIG. 28. This structure information (1) includes the structure information portion (2) for the headquarters system 201, the structure information portion (3) for the Yugoslavian branch system 211, and the structure information portion (4) for the Asian areas (including Japan). The structure information portion (4) includes the structure information portion (5) for the Asian branch system 221, and the structure information portion (6) for the Japanese branch system 231. The structure information portions (2), (3), (5), and (6) are respectively shown in FIGS. 29 through 32. In the structure information, relay system information, assembly information, element data information, and delivery destination information are respectively described by using <gateway>, <structure>, <data list>, and <receptionist list>.

A relay system "newyork@delivery.com" specified by a gateway tag is assumed to represent the headquarters system 201 in FIG. 28 or 29.

The headquarters system 201 first analyzes the element data information in the structure information portion (2). Namely, a data_list tag is analyzed. Here, a database 202 of the headquarters system 201 is described as a storage location of the element data to be collected by the headquarters system 201 in the data_list tag. Accordingly, the headquarters system 201 starts up a data storing unit within the headquarters system 201, and obtains element data "world_news.xml" from the database 202.

The headquarters system 201 then generates assembled data by assembling the element data according to the assembly information in the structure information portion (2). Namely, the assembled data is generated according to the description of a structure tag. The assembly information is exemplified in FIGS. 33A and 33B. These two assembly information are substantially the same. That is, "world_news.xml" is specified as data to be delivered, and date and year, a version number, etc. are further described. The assembly information shown in FIG. 33B is different from that shown in FIG. 33A in the point that element data information (a data list) is described.

FIG. 34 exemplifies the assembled data generated by the headquarters system 201 according to the assembly information in the structure information portion (2). "world_news.xml" is embedded into a world_news tag in this assembled data. The process generating the assembled data according to assembly information is executed by a data managing unit.

The headquarters system 201 delivers the assembled data to delivery destinations according to the delivery destination information in the structure information portion (2). Namely, the assembled data is delivered to subscribers U-1 through U-n according to the description of the receptionist-list tag. In this way, the subscribers U-1 through U-n receive "world_news.xml". Then, the headquarters system 201 deletes the structure information portion (2) from the structure information (1).

Furthermore, the headquarters system 201 analyzes the delivery_info tag shown in FIG. 28 in order to deliver the remaining structure information to relay systems. Here, the delivery_info tags in the structure information portions (3) and (4) are described on the same level. Accordingly, the headquarters system 201 separates the remaining structure information into the structure information portions (3) and (4), and delivers the separated portions according to the respective relay system information. Namely, the structure information portion (3) is delivered to the Yugoslavian branch system (yugo@delivery.com) 211 according to the description of its gateway tag, whereas the structure information portion (4) is delivered to the Asian branch system (asia@delivery.com) 221 according to the description of its gateway tag. At this time, the headquarters system 201 delivers the assembled data "news.xml" to the Yugoslavian branch system 211 and the Asian branch system 221. This assembled data "news.xml" includes "world_news.xml".

In this way, the Yugoslavian branch system 211 receives "world_news.xml" and the structure information portion (3), whereas the Asian branch system 221 receives "world_news.xml" and the structure information portion (4).

The Yugoslavian branch system 211 analyzes the element data information in the structure information portion (3) shown in FIG. 28 or 30. That is, the data_list tag is analyzed. Since no protocol name specification is included in this data_list tag, the Yugoslavian branch system 211 recognizes that there is no element data to be collected except for the assembled data received from the headquarters system 201. Additionally, because no assembly information is described in the structure information portion (3), no process is performed for the assembled data received from the headquarters system 201. The Yugoslavian branch system 211 then delivers the assembled data received from the headquarters system 201 to respective delivery destinations according to the delivery destination information in the structure information portion (3). Namely, the assembled data is delivered to the subscribers Y-1 through Y-n according to the description of the receptionist_list tag. In this way, the subscribers Y-1 through Y-n receive "world_news.xml".

Then, the Yugoslavian branch system 211 deletes the structure information portion (3) from the received structure information. In this case, no data is left as the structure information. Accordingly, the entire process is regarded as being completed, and the data delivery process is terminated in the Yugoslavian branch system 211.

In the meantime, the Asian branch system 221 analyzes the element data information in the structure information portion (5) shown in FIG. 28 or 31. Namely, the data_list tag is analyzed. As a result, the assembled data "news.xml" received from the headquarters system 201, and the element data "asian_news.xml" stored in a database 222 are recognized. Accordingly, the Asian branch system 221 extracts element data "asian_news.xml" from the database 222 according to the element data information.

Next, the Asian branch system 21 generates assembled data by assembling the element data according to the assembly information in the structure information portion (5). That is, the assembled data is generated according to the description of the structure tag. The assembly information is exemplified in FIG. 35. In this assembly information, the assembled data "news.xml" received from the headquarters system 201, and "Asian_news.xml" extracted from the database 222 are specified as data to be delivered.

FIG. 36 exemplifies the assembled data generated by the Asian branch system 221 according to the assembly information in the structure information portion (5). In this assembled data, "asian_news.xml" is embedded into the asian_news tag in this assembled data, and "world_news.xml" is embedded into the world_news tag.

The Asian branch system 221 delivers the assembled data to delivery destinations according to the delivery destination information in the structure information portion (5). Namely, the data delivery is executed according to the description of the receptionist_list tag. However, the addresses of the delivery destinations are not described, but only a category "asia" is specified in the receptionist_list tag. Accordingly, the Asian branch system 221 accesses a subscriber list 223 by using this category mane as a key and recognizes the delivery destinations belonging to the category "asia". Then, the Asian branch system 221 delivers the assembled data including "asian_news.xml" and "world_news.xml" to the subscribers A-1 through A-n. In this way, the subscribers A-1 through A-n receive "asian_news.xml" and "world_news.xml".

Then, the Asian branch system 221 deletes the structure information portion (5) from the structure information portion (4). As a result, structure information portion (6) is left. The Asian branch system 221 delivers the structure information portion (6) to the Japanese branch system (japan@delivery.com.jp) 231 according to the description of the delivery_info tag in the structure information portion (6). At this time, the Asian branch system 221 delivers the assembled data "news.xml" to the Japanese branch system 231. The assembled data "news.xml" is generated by the Asian branch system 221, and includes "asian_news.xml" and "world_news.xml".

The Japanese branch system 231 analyzes the element data information in the structure information portion (6) shown in FIG. 28 or 32. Namely, the data_list tag is analyzed. As a result, the assembled data "news.xml" received from the Asian branch system 221, and the element data "japan_news.xml" stored in a database 232 are recognized. The Japanese branch system 221 extracts the element data "japan_news.xml" from the database 232.

Next, the Japanese branch system 231 generates complete data from the element data and the received assembled data according to the assembly information in the structure information portion (6). Namely, the delivery data is generated according to the description of the structure tag. The assembly information is exemplified in FIG. 37. In this assembly information, assembled data "news.xml" received from the Asian branch system 221, and "japan_news.xml" extracted from the database 232 are specified as data to be delivered. Here, the assembled data "news.xml" received from the Asian branch system 221 includes "asian_news.xml" and "world_news.xml" as described above.

FIG. 38 is shows an example of the complete data generated according to the assembly information in the structure information portion (6) in the Japanese branch system 231. In this complete data, "japan_news.xml", "asian_news.xml", and "world_news.xml" are respectively embedded into the japan_news tag, the asian_news tag, and the world_news tag.

The Japanese branch system 231 delivers the complete data to delivery destinations according to the delivery destination information in the structure information portion (6). Namely, the data delivery is executed according to the description of the receptionist_list tag. However, the addresses of the delivery destinations are not described in the receptionist_list tag, but only a category "japan" is specified in the receptionist-list tag. Accordingly, the Japanese branch system 231 accesses a subscriber list 233 by using this category name as a key, recognizes the delivery destinations belonging to the category "japan", and delivers the complete data including "asian_news.xml", "world_news.xml", and "japan_news.xml" to the subscribers J-1 through J-n. In this way, the subscribers J-1 through J-n who make a contract with the Japanese branch receive "asian_news.xml", "world_news.xml", and "japan_news.xml".

Then, the Japanese branch system 231 deletes the structure information portion (6) from the received structure information. In this case, no data is left as the structure information. Accordingly, the entire process is regarded as being completed, and the data delivery process is terminated in the Japanese branch system 231.

In the above described embodiments, one branch office system delivers common data to a plurality of subscribers. With the data delivering system according to the present invention, however, a branch office system can deliver individual data depending on each subscriber according to a description of structure information.

FIG. 39 exemplifies the assembly information in the structure information used when data that differs depending on each subscriber is delivered. Exemplified here is the assembly information for the data to be delivered from the Japanese branch system 231 to a certain subscriber. In this assembly information, "personal_news.xml" is specified as data to be delivered to the subscriber in addition to "news.xml" and "japan_news.xml".

Figure 40:
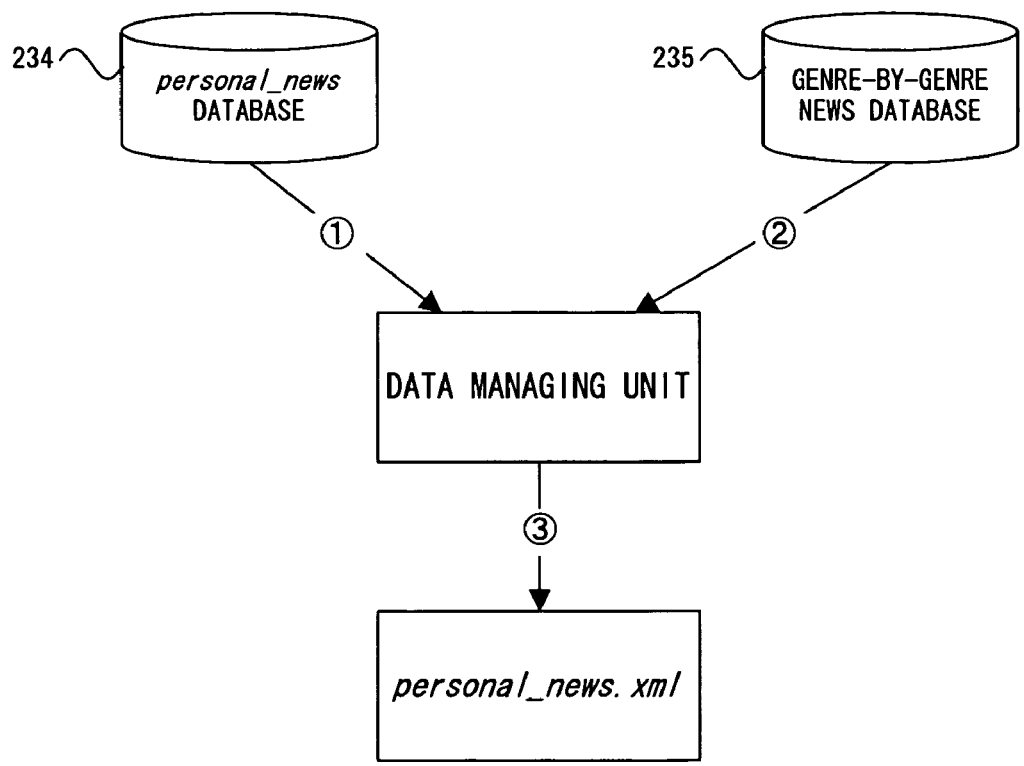
FIG. 40 explains the method collecting element data for each subscriber.

FIG. 40 explains a method collecting element data for each subscriber. Illustrated here is the operations of the Japanese branch system 231 which generates complete data according to the assembly information shown in FIG. 39.

When recognizing that "personal_news.xml" is specified in the assembly information, the Japanese branch system 231 accesses a personal news database 234 by using the subscriber address to which data is to be delivered as a key. The personal news database 234 manages the genres which are preselected by the subscriber for each delivery destination address. Here, the genres are, for example, politics, sports, the economy, international topics, society news, etc.

Then, the Japanese branch system 231 collects corresponding element data from a genre-by-genre news database 235 based on the genre information obtained from the personal news database 234. As a result, "personal_news.xml" for each subscriber can be obtained. The Japanese branch system 231 then delivers "personal_news.xml" to the subscriber along with "world_news.xml", etc.

Figure 41:
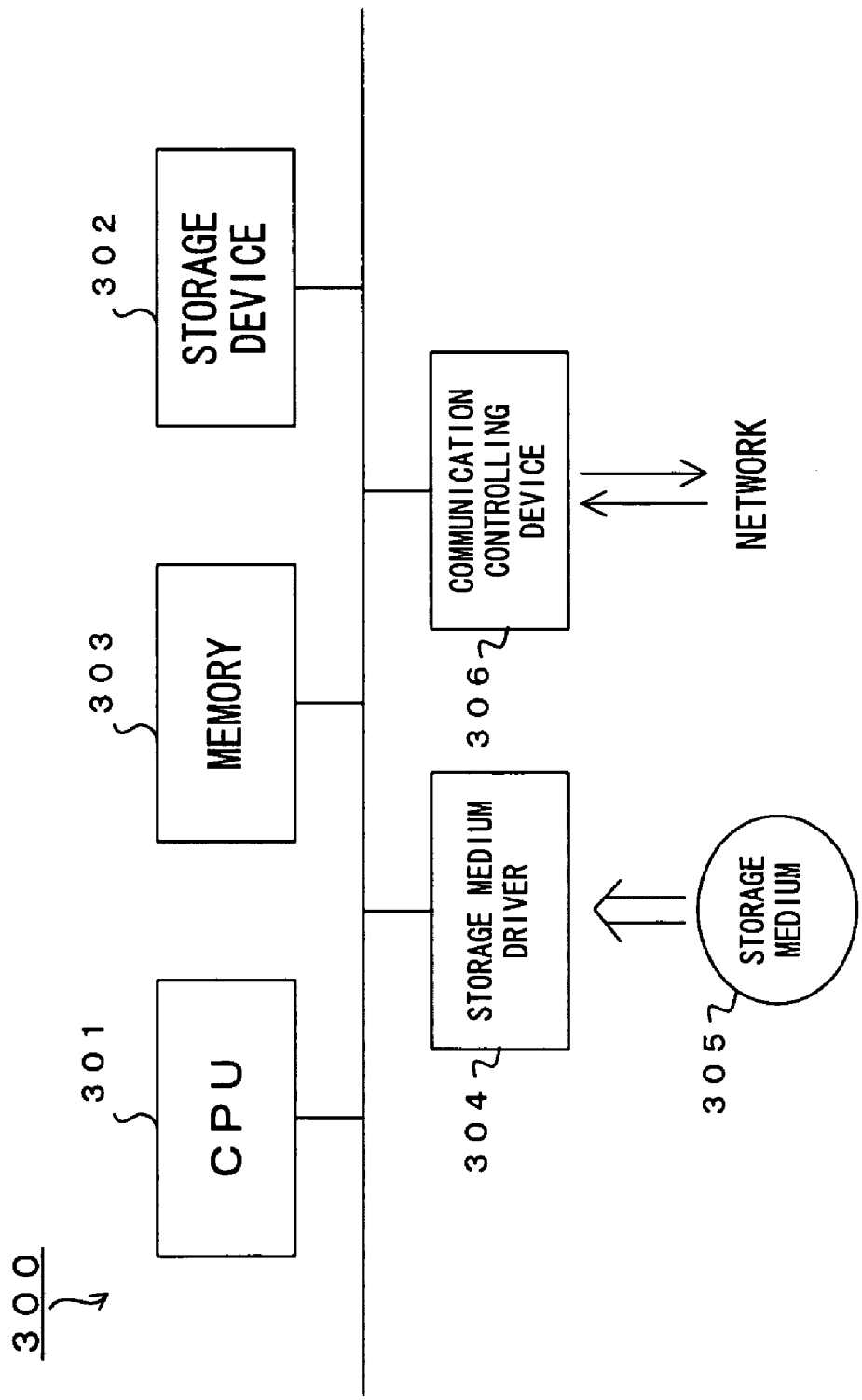
FIG. 41 is a block diagram showing the configuration of a computer which executes programs describing the capabilities of the present invention.

The capabilities implementing the above described data deliveries (the delivery source system, the relay system, the resource system, and the delivery destination system) are realized by executing programs describing the above described processes with a computer. The block diagram of the computer 300 executing the programs is shown in FIG. 41.

A CPU 301 loads the programs describing the processes shown in the above described flowcharts from a storage device 302 into a memory 303, and executes the programs. The storage device 302 is, for example, a hard disk, and stores the above described programs. The memory 303 is, for example, a semiconductor memory, and is used as a working area of the CPU 301.

A storage medium driver 304 accesses a portable storage medium 305 according to an instruction of the CPU 301. The portable storage medium 305 is, for example, a semiconductor device (PC card, etc.), a medium (a floppy disk, a magnetic tape, etc.) to/from which information is input/output by a magnetic operation, a medium (optical disk, etc.) to/from which information is input/output by an optical operation, and the like. A communication controlling device 306 transmits/receives data to/from a network according to an instruction of the CPU 301.

Figure 42:
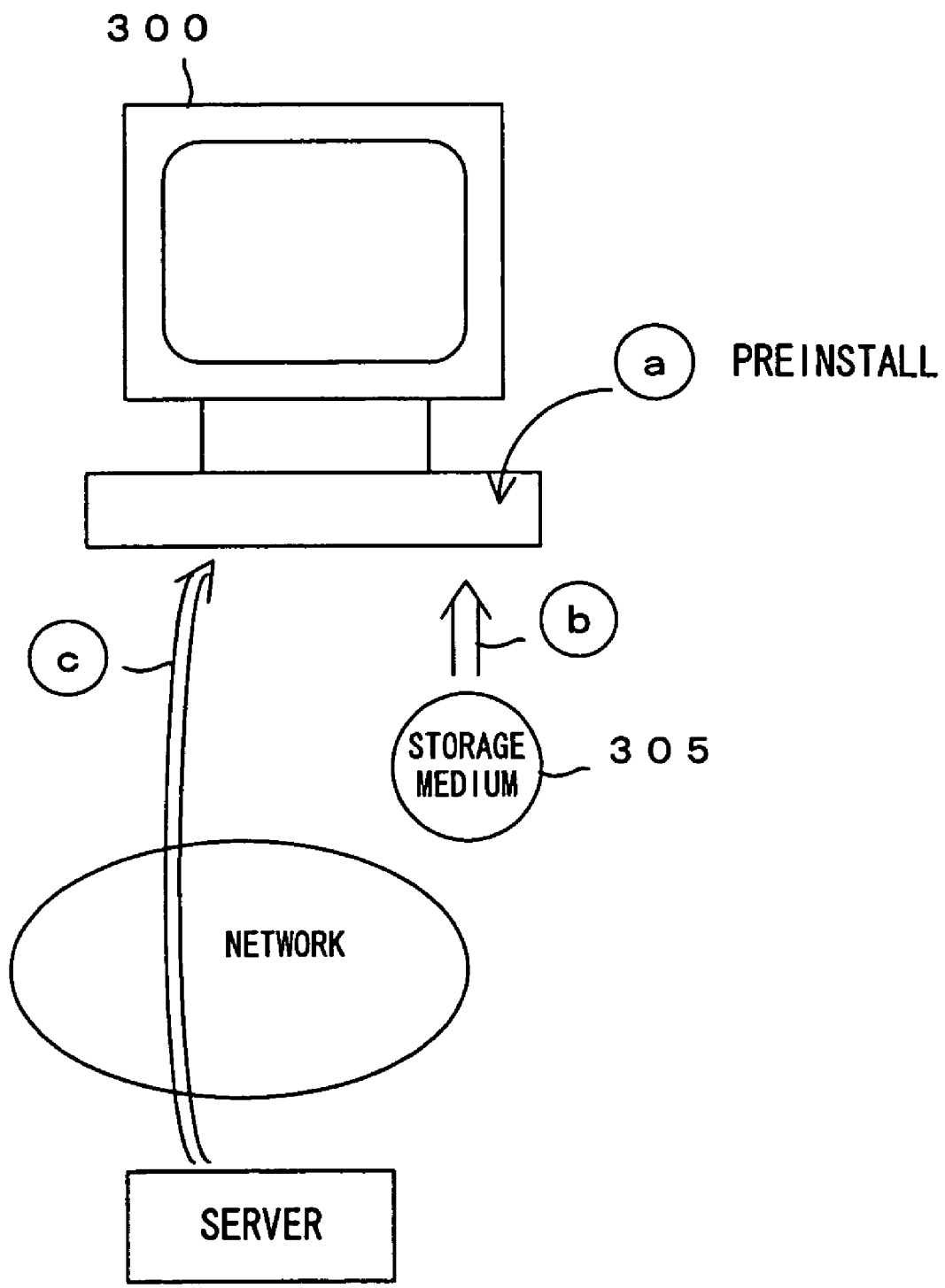
FIG. 42 explains the method providing software programs, etc., which relate to the present invention.

FIG. 42 explains the method providing software programs, etc. relating to the present invention. The programs relating to the present invention are provided, for example, with any of the following methods.

(a) The programs are installed in the computer 300, and provided. In this case, the programs, etc. are pre-installed prior to shipment.

(b) The programs are stored onto a portable storage medium and provided. In this case, the programs, etc., which are stored onto the portable storage medium 305, are fundamentally installed in the storage device 302 via the storage medium driver 304.

(c) The programs are provided from a server on a network. In this case, the programs, etc., which are stored in the server, are fundamentally obtained by being downloaded by the computer 300.

According to the present invention, a delivery source system does not need to collect all of data to be delivered, so that the load on the delivery source system is reduced. Additionally, the delivery source system does not need to recognize individual delivery destinations, thereby facilitating address management, etc. in the delivery source system. Furthermore, element data can be assembled by devices other than a delivery source device, whereby the load on the delivery source system is reduced. Still further, an optimum device for which a load distribution is considered collects data, leading to an increase in a data delivery efficiency.

What is claimed is:

1. A data delivering method delivering data from a source device to a destination device in a system including the source device, a first relay device, and second and third relay devices arranged in parallel, comprising:

generating structure information, which includes first information to identify first element data to be collected by the first relay device, second information to identify second element data to be collected by the second relay device, third information to identify third element data to be collected by the third relay device and fourth information to identify the second relay device and the third relay device, by the source device;

collecting the first element data by the first relay device according to the first information in the structure information;

transmitting the first element data and the structure information from the first relay device to both of the second and third relay devices according to the fourth information in the structure information;

collecting the second element data by the second relay device according to the second information in the structure information;

delivering the first and the second element data from the second relay device to a destination device connected to the second relay device;

collecting the third element data by the third relay device according to the third information in the structure information; and delivering the first and the third element data from the third relay device to a destination device connected to the third relay device.

2. A data delivering method delivering data from a source device to a destination device in a system including the source device, a first relay device, a second relay device connected to the first relay device in series, and the destination device, comprising:

generating structure information, which includes first information to identify first element data to be collected by the first relay device, second information to identify second element data to be collected by the second relay device and third information to identify the second relay device and the destination device, by the source device;

collecting the first element data by the first relay device according to the first information in the structure information;

transmitting the first element data and the structure information from the first relay device to the second relay device according to the third information in the structure information;

collecting the second element data by the second relay device according to the second information in the structure information; and delivering the first and the second element data from the second relay device to the destination device according to the third information in the structure information.

3. A data delivering system delivering data from a source device to a destination device in a system including the source device, a first relay device, a second relay device connected to the first relay device in series, and the destination device, the data delivering system comprising:

said source device generating structure information which includes first information to identify first element data to be collected by the first relay device, second information to identify second element data to be collected by the second relay device and third information to identify the second relay device and the destination device, said first relay device collecting the first element data according to the first information in the structure information and transmitting the first element data and the structure information to said second relay device according to the third information in the structure information, and said second relay device collecting the second element data and delivering the first and second element data according to the second information in the structure information.

4. A data delivering system delivering data from a source device to a destination device in a system including the source device, a first relay device, and second and third relay devices arranged in parallel, the data delivering system comprising:

said source device generating structure information which includes first information to identify first element data to be collected by the first relay device, second information to identify second element data to be collected by the second relay device, third information to identify third element data to be collected by the third relay device and fourth information to identify the second relay device and the third relay device, said first relay device collecting the first element data according to the first information in the structure information and transmitting the first element data and the structure information to both the second and third relay devices according to the fourth information in the structure information, said second relay device collecting the second element data and delivering the first and second element data to a destination device connected to said second relay device according to the second information in the structure information, and said third relay device collecting the third element data and delivering the first and third element data to a destination device connected to said third relay device according to the third information in the structure information.

5. A data delivering method delivering data from a source device to a destination device in a system including the source device, a first relay device, a plurality of second relay devices arranged in parallel, comprising:

generating, by the source device, structure information including information specifying a relay device group including a plurality of second relay devices;

collecting first element data by the first relay device according to the structure information;

recognizing, by the first relay device, the plurality of second relay devices belonging to the relay device group specified by the structure information;

delivering the first element data to the plurality of second relay devices;

respectively collecting element data by the plurality of second relay devices according to the structure information; and delivering the first element data and the element data collected by the plurality of second relay devices from the plurality of second relay devices to corresponding destination devices.

* * * * *